United States Patent
Urmson et al.

(10) Patent No.: US 12,459,535 B1
(45) Date of Patent: Nov. 4, 2025

(54) AUTONOMOUS VEHICLE ANOMALOUS EVENT DETECTION

(71) Applicant: Aurora Operations, Inc., Pittsburgh, PA (US)

(72) Inventors: Christopher Paul Urmson, Los Altos, CA (US); Sterling J. Anderson, Sunnyvale, CA (US); J. Andrew Bagnell, Pittsburgh, PA (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

(21) Appl. No.: 19/005,093

(22) Filed: Dec. 30, 2024

Related U.S. Application Data

(63) Continuation of application No. 19/003,508, filed on Dec. 27, 2024.

(60) Provisional application No. 63/738,993, filed on Dec. 26, 2024.

(51) Int. Cl.
*B60W 60/00* (2020.01)
*B60W 50/00* (2006.01)

(52) U.S. Cl.
CPC .......... *B60W 60/001* (2020.02); *B60W 50/00* (2013.01); *B60W 2050/0028* (2013.01); *B60W 2556/45* (2020.02)

(58) Field of Classification Search
None
See application file for complete search history.

(56) References Cited

U.S. PATENT DOCUMENTS

| | | | |
|---|---|---|---|
| 9,507,346 B1* | 11/2016 | Levinson | G06F 3/04847 |
| 10,654,476 B2* | 5/2020 | Wray | G08G 1/166 |
| 10,761,542 B1* | 9/2020 | Fairfield | G05D 1/0027 |
| 11,003,916 B2* | 5/2021 | Hummelshøj | G06V 20/20 |
| 11,016,485 B2* | 5/2021 | Pedersen | G05D 1/0038 |
| 11,215,982 B2* | 1/2022 | Urano | G05D 1/0011 |
| 11,269,332 B2* | 3/2022 | Vozar | G08G 1/0145 |
| 11,472,436 B1* | 10/2022 | Patel | G01S 7/4808 |
| 11,472,444 B2* | 10/2022 | Goeddel | G06V 10/811 |
| 11,560,154 B1* | 1/2023 | Gate | G01C 21/3614 |
| 11,644,830 B1* | 5/2023 | Gate | G05D 1/0038 701/2 |
| 11,938,963 B1* | 3/2024 | Joubert | B60W 40/10 |
| 2015/0248131 A1* | 9/2015 | Fairfield | G05D 1/0038 701/2 |
| 2016/0334230 A1* | 11/2016 | Ross | G05D 1/0027 |
| 2017/0192426 A1* | 7/2017 | Rust | B60W 30/00 |
| 2018/0136651 A1* | 5/2018 | Levinson | G05D 1/0027 |
| 2019/0011910 A1* | 1/2019 | Lockwood | G05D 1/0038 |
| 2019/0163176 A1* | 5/2019 | Wang | G05D 1/0088 |
| 2019/0188493 A1* | 6/2019 | Tiziani | G05D 1/0214 |
| 2019/0196465 A1* | 6/2019 | Hummelshøj | B60W 60/0015 |
| 2019/0258246 A1* | 8/2019 | Liu | G05D 1/0038 |

(Continued)

*Primary Examiner* — Jonathan M Dager
(74) *Attorney, Agent, or Firm* — Gray Ice Higdon

(57) ABSTRACT

Generative models may be used in the detection and/or handling of various events encountered by an autonomous vehicle during its operation. In addition, detected events may may be used in connection with various purposes external from the autonomous vehicle, e.g., for the purpose of surfacing various environmental conditions, events, or other circumstances to a fleet or a third party, for managing vehicle logs and/or for managing teleassist sessions between an autonomous vehicle and a remote teleassist system.

22 Claims, 15 Drawing Sheets

(56) References Cited

U.S. PATENT DOCUMENTS

| | | | |
|---|---|---|---|
| 2019/0354111 A1* | 11/2019 | Cheng | G05D 1/0011 |
| 2020/0004241 A1* | 1/2020 | Levinson | G05D 1/0044 |
| 2020/0097003 A1* | 3/2020 | Wray | G08G 1/096775 |
| 2020/0110411 A1* | 4/2020 | Vozar | G06V 20/56 |
| 2020/0150661 A1* | 5/2020 | Vozar | H04W 4/40 |
| 2020/0209846 A1* | 7/2020 | Chen | B60W 30/18163 |
| 2020/0290619 A1* | 9/2020 | Mehdi | B60W 40/04 |
| 2020/0293038 A1* | 9/2020 | Laurent | G05D 1/0278 |
| 2020/0310417 A1* | 10/2020 | Pedersen | G05D 1/0038 |
| 2020/0379457 A1* | 12/2020 | Ostafew | G05D 1/0027 |
| 2021/0116907 A1* | 4/2021 | Altman | G05D 1/223 |
| 2021/0323573 A1* | 10/2021 | Gogna | G01C 21/3407 |
| 2022/0066440 A1* | 3/2022 | Sucan | G05D 1/0016 |
| 2022/0073097 A1* | 3/2022 | Sucan | G05D 1/0016 |
| 2022/0081005 A1* | 3/2022 | Brown | G08G 1/162 |
| 2022/0081011 A1* | 3/2022 | Kleinau | G06V 20/584 |
| 2022/0126878 A1* | 4/2022 | Moustafa | B60W 40/09 |
| 2022/0135067 A1* | 5/2022 | Pfadler | G07C 5/008 701/23 |
| 2022/0194419 A1* | 6/2022 | Houshmand | B60W 60/0023 |
| 2022/0227389 A1* | 7/2022 | Tam | G05D 1/617 |
| 2023/0032713 A1* | 2/2023 | Kothbauer | G05D 1/0011 |
| 2023/0060435 A1* | 3/2023 | Funke | G05D 1/225 |
| 2023/0127379 A1* | 4/2023 | Kothbauer | G05D 1/0038 701/23 |
| 2023/0146830 A1* | 5/2023 | Jornod | B60W 30/146 701/2 |
| 2023/0176573 A1* | 6/2023 | Kumavat | G05D 1/0038 701/23 |
| 2023/0192134 A1* | 6/2023 | Winter | G08G 1/0969 701/23 |
| 2023/0194286 A1* | 6/2023 | Winter | G01C 21/3407 |
| 2023/0331257 A1* | 10/2023 | Paxton | B60W 60/005 |
| 2024/0034348 A1* | 2/2024 | Robinson | B60W 60/001 |
| 2024/0036571 A1* | 2/2024 | Goldman | G05D 1/2279 |
| 2024/0192680 A1* | 6/2024 | Gupta | G06Q 10/063116 |
| 2024/0219905 A1* | 7/2024 | Maniatopoulos | G08G 1/202 |
| 2025/0033670 A1* | 1/2025 | Boule | G05D 1/0022 |
| 2025/0033673 A1* | 1/2025 | Stumpf | B60W 60/005 |
| 2025/0053168 A1* | 2/2025 | Mertens | G06Q 10/063112 |

\* cited by examiner

AUTONOMOUS VEHICLE ANOMALOUS EVENT DETECTION

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

Nevertheless, even as autonomous vehicles expand the range of roadways, scenarios, and other circumstances they are capable of handling, autonomous vehicles will still inevitably encounter some circumstances during operation for which they have not been specifically adapted to handle.

In some instances, teleassist may be used to assist when such circumstances are encountered. With teleassist, a remote system or operator may be placed in communication with an autonomous vehicle to assist with resolving any such circumstances. Initiation of a teleassist session, however, generally increases communication and computational costs, and in some instances can interrupt the standard operation of an autonomous vehicle. As such, it is generally desirable to minimize the frequency and duration of teleassist sessions with which an autonomous vehicle participates, particularly those where human involvement is required.

Therefore, a continuing need exists in the art for improved manners of detecting, managing, interpreting, and reacting to the various circumstances that an autonomous vehicle may encounter during operation.

SUMMARY

The present disclosure is related in some aspects to the use of generative models in the detection and/or handling of various events encountered by an autonomous vehicle during its operation. The present disclosure is also related in some aspects to the use of such detected events in connection with various purposes external from the autonomous vehicle, e.g., for the purpose of surfacing various circumstances s to a fleet or a third party, for managing vehicle logs and/or for managing teleassist sessions between an autonomous vehicle and a remote teleassist system.

Therefore, consistent with some implementations, a method implemented by one or more processors may include receiving perception data captured by one or more perception sensors of an autonomous vehicle during operation of the autonomous vehicle in an environment during an occurrence of a perceived event in the environment, initiating querying of a generative model using the received perception data and environmental event data as input, the environmental data representing a set of predetermined events capable of occurring in the environment, receiving response data generated by the generative model in response to initiating the querying of the generative model, the received response data indicating that the perceived event is an anomalous event that is distinct from the set of predetermined events represented by the environmental event data, and generating a notification of the anomalous event in response to receiving the response data.

Moreover, in some implementations, the perception data includes image data, LIDAR data, RADAR data, audio data, inertial measurement data, temperature data, and/or pressure sensor data. Further, in some implementations, the generative model is resident in an autonomous vehicle control system of the autonomous vehicle. In some implementations, the generative model is remote from the autonomous vehicle.

Also, in some implementations, the environmental event data includes textual data describing at least a subset of the set of predetermined events. Moreover, in some implementations, the environmental event data includes a plurality of vector embeddings describing at least a subset of the set of predetermined events. In addition, in some implementations, the response data is first response data, and initiating querying of the generative model includes initiating querying of the generative model using textual environmental event data, and the method further includes, after receiving the first response data indicating that the perceived event is an anomalous event, initiating querying of the generative model using the perception data and a plurality of vector embeddings representing at least a subset of the set of predetermined events capable of occurring in the environment, and receiving second response data generated by the generative model in response to initiating the querying of the generative model using the perception data and the plurality of vector embeddings.

Also, in some implementations, the response data is first response data and the generative model is a first generative model, and initiating querying of the generative model includes initiating querying of the first generative model using textual environmental event data, and the method further includes, after receiving the first response data indicating that the perceived event is an anomalous event, initiating querying of a second generative model using the perception data and a plurality of vector embeddings representing at least a subset of the set of predetermined events capable of occurring in the environment, and receiving second response data generated by the second generative model in response to initiating the querying of the generative model using the perception data and the plurality of vector embeddings.

In some implementations, the first generative model is resident in an autonomous vehicle control system of the autonomous vehicle and the second generative model is remote from the autonomous vehicle. In addition, in some implementations, the first generative model is a multi-modal vision and language model and the second generative model is a generalized foundation model. Also, in some implementations, the response data further includes one or more text tokens describing the anomalous event and generated by the generative model.

In some implementations, the autonomous vehicle is among a fleet of autonomous vehicles, and generating the notification includes forwarding the notification to a remote fleet service associated with the fleet of autonomous vehicles to notify other autonomous vehicles in the fleet of the anomalous event. Moreover, in some implementations, generating the notification includes forwarding the notification to a third-party service to notify the third party of the anomalous event.

Some implementations may also include periodically initiating querying of the generative model using perception data captured by the one or more perception sensors of the autonomous vehicle during operation of the autonomous vehicle to detect anomalous events during operation of the autonomous vehicle, and dynamically adjusting a rate of the periodic queries of the generative model based on an operational state of the autonomous vehicle.

Also, in some implementations, dynamically adjusting the rate of periodic queries of the generative model based on the operational state of the autonomous vehicle includes increasing or decreasing the rate of periodic queries based on whether the autonomous vehicle is in or approaching an intersection, in or approaching a construction area, or after detection of the anomalous event. In addition, some implementations may further include generating embeddings for the perception data in the autonomous vehicle and communicating the embeddings to a remote service, and initiating querying of the generative model is performed remote from the autonomous vehicle and uses the embeddings. Moreover, in some implementations, generating the embeddings is performed by a first head of a multi-head perception model of a perception system of the autonomous vehicle.

Some implementations may further include sequentially initiating a plurality of queries of the generative model using the perception data, the plurality of queries having increasing specificity. In addition, some implementations may further include controlling the autonomous vehicle or another autonomous vehicle based on the indication that the perceived event is an anomalous event. Further, in some implementations, generating the notification of the anomalous event in response to receiving the response data is performed during the occurrence of the perceived event in the environment.

Consistent with some implementations, a method implemented by one or more processors may include receiving perception data captured by one or more perception sensors of an autonomous vehicle during operation of the autonomous vehicle in an environment during the occurrence of a perceived event in the environment, processing the perception data in an autonomous vehicle control system of the autonomous vehicle to generate one or more embeddings representing the perception data captured by the one or more perception sensors, communicating the embeddings from the autonomous vehicle to a remote service to cause the remote service to initiate querying of a generative model using the communicated embeddings to identify the perceived event in the environment.

In addition, in some implementations, initiating the querying of the generative model further uses environmental event data representing a set of predetermined events capable of occurring in the environment. Further, in some implementations, initiating the querying of the generative model identifies that the perceived event is an anomalous event that is distinct from the set of predetermined events represented by the environmental event data. Some implementations may also include generating a notification of the perceived event in response to receiving the response data.

In addition, in some implementations, processing the perception data is performed by a perception model in a perception system of the autonomous vehicle control system. Moreover, in some implementations, the perception model is a multi-head perception model, and processing the perception data is performed by a first head of the multi-head perception model. In addition, in some implementations, the first head of the multi-head perception model is trained to output embeddings describing the environment represented in the perception data. Moreover, in some implementations, the first head of the multi-head perception model is configured to indicate an anomalous event that is distinct from a plurality of events for which the multi-head perception model has been trained to detect.

Further, in some implementations, the embeddings include text embeddings. Also, in some implementations, the embeddings include vector embeddings. In addition, in some implementations, the embeddings represent outputs of multiple perception sensors. In some implementations, the embeddings represent outputs of multiple image sensors having different fields of view around the autonomous vehicle.

Also, in some implementations, the generative model is a second generative model, the method further including prior to communicating the embeddings from the autonomous vehicle to the remote service, initiating querying of a first generative model resident in the autonomous vehicle to attempt to identify the perceived event. Moreover, in some implementations, the generative model is a generalized foundation model. In addition, some implementations may also include controlling the autonomous vehicle or another autonomous vehicle based on identification of the perceived event.

Consistent with some implementations, a method implemented by one or more processors may include receiving perception data captured by one or more perception sensors of an autonomous vehicle during operation of the autonomous vehicle in an environment during the occurrence of a perceived event in the environment, initiating querying of a first model resident in the autonomous vehicle using the received perception data to attempt to identify the perceived event, receiving response data generated by the first model in response to initiating the querying of the first model, the received response data indicating that the perceived event is an anomalous event, and in response to the received response data indicating that the perceived event is an anomalous event, initiating querying of a second generative model remote from the autonomous vehicle to attempt to identify the perceived event.

In some implementations, the first model is a perception model in a perception system of the autonomous vehicle control system. Moreover, in some implementations, the perception model is a multi-head perception model, and the attempt to identify the perceived event is performed by a first head of the multi-head perception model. In some implementations, the first head of the multi-head perception model is configured to indicate the anomalous event based on detecting that the perceived event differs from a plurality of events for which the multi-head perception model has been trained to detect.

Also, in some implementations, the first head of the multi-head perception model is configured to process the perception data to generate embeddings representing the perception data captured by the one or more perception sensors. In some implementations, the embeddings include text embeddings. In addition, in some implementations, the embeddings include vector embeddings. Further, in some implementations, the embeddings represent outputs of multiple perception sensors. In addition, in some implementations, the embeddings represent outputs of multiple image sensors having different fields of view around the autonomous vehicle.

Further, in some implementations, initiating the querying of the first model further uses environmental event data representing a set of predetermined events capable of occurring in the environment. In addition, in some implementations, initiating the querying of the first model identifies that the perceived event is distinct from the set of predetermined events represented by the environmental event data.

Also, in some implementations, the environmental event data includes textual data describing at least a subset of the set of predetermined events. In some implementations, the environmental event data is first environmental event data, and initiating querying of the second generative model uses second environmental event data that includes a plurality of vector embeddings describing at least a subset of the set of predetermined events. In addition, in some implementations, the second generative model is a generalized foundation model. In addition, some implementations may also include controlling the autonomous vehicle or another autonomous vehicle based on identification of the perceived event.

Consistent with some implementations, a method implemented by one or more processors may include receiving perception data captured by one or more perception sensors of an autonomous vehicle during operation of the autonomous vehicle in an environment during the occurrence of a perceived event in the environment, initiating querying of a first generalized foundation model using the received perception data to generate embeddings associated with one or more rare events in the environment, and initiating querying of a second model using the generated embeddings to attempt to identify the perceived event, where the second model is trained using embeddings identifying a plurality of rare events in the environment and generated by the first generalized foundation model.

In some implementations, the perception data includes image data, LIDAR data, RADAR data, audio data, inertial measurement data, temperature data, and/or pressure sensor data. Moreover, in some implementations, each of the first generalized foundation model and the second model is remote from the autonomous vehicle. In addition, in some implementations, initiating querying of the first generalized foundation model further uses environmental event data representing at least a portion of the plurality of rare events. In some implementations, the environmental event data includes textual data describing at least a subset of the plurality of rare events. Also, in some implementations, the environmental event data includes a plurality of vector embeddings describing at least a subset of the plurality of rare events. In addition, some implementations may also include, prior to initiating querying of the first generalized foundation model, initiating querying of a third model resident in the autonomous vehicle to attempt to identify the perceived event. In some implementations, the third model is a multi-modal vision and language model.

In addition, some implementations may further include periodically initiating querying of the first generalized foundation model using perception data captured by the one or more perception sensors of the autonomous vehicle during operation of the autonomous vehicle to detect anomalous events during operation of the autonomous vehicle. Some implementations may further include dynamically adjusting a rate of the periodic queries of the first generalized foundation model based on an operational state of the autonomous vehicle. Further, in some implementations, dynamically adjusting the rate of periodic queries of the generative model based on the operational state of the autonomous vehicle includes increasing or decreasing the rate of periodic queries based on whether the autonomous vehicle is in or approaching an intersection, in or approaching a construction area, or after detection of the anomalous event.

In addition, in some implementations, the first generalized foundation model is configured to identify one or more potential rare events corresponding to the perceived event, and the second model is configured to refine an output of the first generalized foundation model to identify the perceived event from among the one or more potential rare events identified by the first generalized foundation model. In addition, some implementations may further include controlling the autonomous vehicle or another autonomous vehicle based on an output of the second model.

Consistent with some implementations, a method implemented by one or more processors may include receiving perception data captured by one or more perception sensors of an autonomous vehicle during operation of the autonomous vehicle in an environment, periodically communicating the received perception data from the autonomous vehicle to a remote service to cause the remote service to initiate querying of a generative model using the communicated perception data to attempt to identify an event occurring in the environment during operation of the autonomous vehicle, and dynamically adjusting a rate of the periodic communications of perception data to the remote service based on an operational state of the autonomous vehicle.

In addition, some implementations may also include dynamically adjusting a rate of periodic queries of the generative model based on the operational state of the autonomous vehicle. In some implementations, dynamically adjusting the rate of periodic communications of perception data to the remote service based on the operational state of the autonomous vehicle includes increasing or decreasing the rate of periodic communications based on whether the autonomous vehicle is in or approaching an intersection.

In addition, in some implementations, dynamically adjusting the rate of periodic communications of perception data to the remote service based on the operational state of the autonomous vehicle includes increasing or decreasing the rate of periodic communications based on whether the autonomous vehicle is in or approaching a construction area. Moreover, in some implementations, dynamically adjusting the rate of periodic communications of perception data to the remote service based on the operational state of the autonomous vehicle includes increasing or decreasing the rate of periodic communications after identification of the event. Further, in some implementations, dynamically adjusting the rate of periodic communications of perception data to the remote service based on the operational state of the autonomous vehicle includes increasing the rate of periodic communications while the autonomous vehicle is queued for a teleassist session between the autonomous vehicle and a remote teleassist system.

In some implementations, dynamically adjusting the rate of periodic communications of perception data to the remote service based on the operational state of the autonomous vehicle includes increasing the rate of periodic communications after initiation of a teleassist session between the autonomous vehicle and a remote teleassist system. Further, in some implementations, at least one of the queries initiated to the generative model queries for presence of an anomalous event in the perception data. In some implementations, at least one of the queries initiated to the generative model is an anomaly query that queries whether anything peculiar is detected in the perception data. Some implementations may further include processing the perception data in an autonomous vehicle control system of the autonomous vehicle to generate embeddings representing the perception data captured by the one or more perception sensors, and periodically communicating the received perception data from the autonomous vehicle to the remote service includes communicating the embeddings. In addition, in some implementations, the generative model is a generalized foundation model.

Consistent with some implementations, a method implemented by one or more processors may include receiving perception data captured by one or more perception sensors of an autonomous vehicle during operation of the autonomous vehicle in an environment, initiating querying of a generative model using the received perception data to identify an event occurring in the environment during operation of the autonomous vehicle, and, in response to identifying the event, automatically initiating a teleassist session between the autonomous vehicle and a remote teleassist system.

Further, in some implementations, initiating querying of the generative model using the received perception data to identify the event includes initiating querying of the generative model using the received perception data to identify an anomalous event occurring in the environment during operation of the autonomous vehicle. Some implementations may also include periodically initiating querying of the generative model using the communicated perception data, and dynamically adjusting a rate of the periodic queries based on an operational state of the autonomous vehicle.

Further, in some implementations, dynamically adjusting the rate of periodic queries based on the operational state of the autonomous vehicle includes increasing the rate of periodic queries while the autonomous vehicle is queued for the teleassist session between the autonomous vehicle and the remote teleassist system. Moreover, in some implementations, dynamically adjusting the rate of periodic queries based on the operational state of the autonomous vehicle includes increasing the rate of periodic queries after initiation of the teleassist session between the autonomous vehicle and the remote teleassist system.

Further, in some implementations, dynamically adjusting the rate of periodic queries based on the operational state of the autonomous vehicle includes increasing or decreasing the rate of periodic queries after identification of the event. Moreover, in some implementations, the query initiated to the generative model queries for presence of an anomalous event in the perception data. In addition, in some implementations, the query initiated to the generative model is an anomaly query that queries whether anything peculiar is detected in the perception data.

Moreover, in some implementations, initiating the querying of the generative model is performed by a remote service that is remote to the autonomous vehicle, and the method further includes processing the perception data in an autonomous vehicle control system of the autonomous vehicle to generate embeddings representing the perception data captured by the one or more perception sensors, and periodically communicating the embeddings from the autonomous vehicle to the remote service.

Some implementations may further include periodically communicating perception data from the autonomous vehicle to a remote service to cause the remote service to initiate the querying of the generative model using the communicated perception data, and dynamically adjusting a rate of the periodic communications based on an operational state of the autonomous vehicle. In some implementations, dynamically adjusting the rate of periodic communications of perception data includes increasing the rate of periodic communications while the autonomous vehicle is queued for the teleassist session. Also, in some implementations, dynamically adjusting the rate of periodic communications of perception data includes increasing the rate of periodic communications after initiation of the teleassist session. In some implementations, the generative model is a generalized foundation model.

Consistent with some implementations, a method implemented by one or more processors may include receiving perception data captured by one or more perception sensors of an autonomous vehicle during operation of the autonomous vehicle in an environment, receiving a teleassist triggering event determined based on the received perception data, initiating querying of a generative model that is remote from the autonomous vehicle using at least a portion of the received perception data to attempt to confirm the teleassist triggering event, and, in response to an inability to confirm the teleassist triggering event from the initiated query of the generative model, automatically rejecting initiation of a teleassist session between the autonomous vehicle and a remote teleassist system.

Further, in some implementations, the teleassist triggering event is detection of an unmapped road sign in the received perception data. Also, in some implementations, the unmapped road sign is a road sign detected in the received perception data but not represented in map data used for operation of the autonomous vehicle.

In addition, some implementations may also include comparing first and second interpretations of the unmapped sign to attempt to validate the first interpretation, and determining the teleassist triggering event includes generating the first interpretation of the unmapped road sign, and initiating querying of the generative model generates the second interpretation of the unmapped sign, and automatically rejecting initiation of the teleassist session is performed in response to the comparison successfully validating the first interpretation. Some implementations may also include providing response data associated with the second interpretation to a teleassist operator during the initiated teleassist session.

Moreover, in some implementations, rejecting initiation of the teleassist session between the autonomous vehicle and the remote teleassist system reverts the autonomous vehicle to a standard operational mode and uses the first interpretation of the unmapped sign in the operation of the autonomous vehicle. Some implementations may also include processing the received perception data using a perception model resident in a perception system of the autonomous vehicle to identify the unmapped road sign.

In addition, in some implementations, the perception model is a multi-head perception model, and processing the perception data is performed by a first head of the multi-head perception model trained to identify road signs in the received perception data. Some implementations may also include, in an autonomous vehicle control system of the autonomous vehicle, determining that the identified unmapped road sign is unmapped. Some implementations may further include, in response to confirming the teleassist triggering event from the initiated query of the generative model, automatically initiating a teleassist session between the autonomous vehicle and the remote teleassist system.

In addition, in some implementations, rejecting initiation of the teleassist session between the autonomous vehicle and the remote teleassist system reverts the autonomous vehicle to a standard operational mode. In addition, some implementations may further include determining the teleassist triggering event in the autonomous vehicle based on the received perception data. Further, in some implementations, the generative model is a generalized foundation model.

Consistent with some implementations, a method implemented by one or more processors may include receiving perception data captured by one or more perception sensors of an autonomous vehicle during operation of the autonomous vehicle in an environment, during operation of the autonomous vehicle in the environment, accessing a location-based teleassist trigger configured to initiate a teleassist session between the autonomous vehicle and a remote teleassist system when a location of the autonomous vehicle meets a location-based criterion, initiating querying of a generative model that is remote from the autonomous vehicle using at least a portion of the received perception data to attempt to confirm a condition associated with the location-based teleassist trigger, and in response to not confirming the condition associated with the location-based teleassist trigger from the initiated query of the generative model, automatically rejecting initiation of the teleassist session between the autonomous vehicle and a remote teleassist system when the location of the autonomous vehicle meets the location-based criterion of the location-based teleassist trigger.

In some implementations, the condition associated with the location-based teleassist trigger is a presence of construction in a portion of the environment associated with the location-based teleassist trigger. In addition, in some implementations, the condition associated with the location-based teleassist trigger is a presence of a road closure in a portion of the environment associated with the location-based teleassist trigger. Moreover, in some implementations, the condition associated with the location-based teleassist trigger is a presence of law enforcement in a portion of the environment associated with the location-based teleassist trigger.

Also, in some implementations, the condition associated with the location-based teleassist trigger is a presence of a crash in a portion of the environment associated with the location-based teleassist trigger. In some implementations, the condition associated with the location-based teleassist trigger is a presence of traffic in a portion of the environment associated with the location-based teleassist trigger. Also, in some implementations, the condition associated with the location-based teleassist trigger is a presence of an adverse weather condition in a portion of the environment associated with the location-based teleassist trigger. Moreover, in some implementations, the condition associated with the location-based teleassist trigger is a presence of an adverse road condition in a portion of the environment associated with the location-based teleassist trigger.

Some implementations may also include, in response to confirming the condition associated with the location-based teleassist trigger from the initiated query of the generative model, automatically initiating a teleassist session between the autonomous vehicle and the remote teleassist system. Some implementations may further include providing response data from the generative model to a teleassist operator during the teleassist session. Moreover, in some implementations, rejecting initiation of the teleassist session between the autonomous vehicle and the remote teleassist system reverts the autonomous vehicle to a standard operational mode. In addition, some implementations may further include notifying a remote service of rejection of the location-based teleassist trigger. In some implementations, the generative model is a generalized foundation model.

Consistent with some implementations, a method implemented by one or more processors may include receiving log data stored by an autonomous vehicle during operation of the autonomous vehicle in an environment, the log data including perception data captured by one or more perception sensors of the autonomous vehicle during the operation of the autonomous vehicle in the environment, initiating querying of a generative model using at least a portion of the perception data in the received log data to identify a noteworthy event occurring during operation of the autonomous vehicle in the environment, and marking a portion of the received log data associated with the identified noteworthy event.

Further, in some implementations, initiating the querying of the generative model using at least a portion of the perception data in the received log data further uses environmental event data representing a set of predetermined events capable of occurring in the environment. In addition, some implementations may further include receiving response data generated by the generative model in response to initiating the querying of the generative model, the received response data indicating that the identified noteworthy event is an anomalous event that is distinct from the set of predetermined events represented by the environmental event data.

Some implementations may also include receiving response data generated by the generative model in response to initiating the querying of the generative model, the received response data indicating that the identified noteworthy event is among the set of predetermined events represented by the environmental event data. Also, in some implementations, the environmental event data includes textual data describing at least a subset of the set of predetermined events. Moreover, in some implementations, the environmental event data includes a plurality of vector embeddings describing at least a subset of the set of predetermined events. Also, in some implementations, the generative model is resident in an autonomous vehicle control system of the autonomous vehicle. Further, in some implementations, the generative model is remote from the autonomous vehicle. Also, in some implementations, the generative model is a generalized foundation model.

In addition, some implementations may further include offloading the received log data with the marked portion to a logging service remote from the autonomous vehicle. In some implementations, initiating the querying of the generative model includes initiating a first query to the generative mode using a first portion of the perception data in the received log data, and the method further includes initiating querying of the generative model using a second portion of the perception data in the received log data, determining an absence of an anomalous event from the initiated query of the generative model using the second portion of the perception data in the received log data, and, in response to determining the absence, omitting offloading of an unmarked portion of the received log data associated with the second portion of the perception data when offloading the marked portion to the logging service.

Some implementations may also include discarding the unmarked portion of the received log data. Some implementations may further include generating one or more training instances using the marked portion of the received log data. In addition, some implementations may also include training a model used by the autonomous vehicle using the one or more training instances. Also, in some implementations, marking the portion of the received log data associated with the identified noteworthy event includes applying a label to the marked portion of the received log data.

Consistent with some implementations, a method implemented by one or more processors may include receiving perception data captured by one or more perception sensors of an autonomous vehicle during operation of the autonomous vehicle in an environment, initiating querying of a generative model using the received perception data to identify an event occurring in the environment during operation of the autonomous vehicle, and, in response to identifying the event, automatically propagating the identified event to a remote distribution service.

Further, in some implementations, the autonomous vehicle is among a fleet of autonomous vehicles, and the remote distribution service is a remote fleet service associated with the fleet of autonomous vehicles, the method further including notifying at least one other autonomous vehicle in the fleet of the identified event. Also, in some implementations, the remote distribution service is a remote third-party service. Moreover, in some implementations, the remote third-party service is a governmental service.

In some implementations, the identified event is a pothole in the roadway, a stranded motorist, an object in the roadway, a road condition, a weather condition, an infrastructure condition, a traffic condition, a crash, or an emergency condition. Moreover, in some implementations, initiating the querying of the generative model using the received perception data further uses environmental event data representing a set of predetermined events capable of occurring in the environment. In addition, some implementations may also include receiving response data generated by the generative model in response to initiating the querying of the generative model, the received response data indicating that the identified event is an anomalous event that is distinct from the set of predetermined events represented by the environmental event data.

Some implementations may also include receiving response data generated by the generative model in response to initiating the querying of the generative model, the received response data indicating that the identified event is among the set of predetermined events represented by the environmental event data. In some implementations, the environmental event data includes textual data describing at least a subset of the set of predetermined events. Also, in some implementations, the environmental event data includes a plurality of vector embeddings describing at least a subset of the set of predetermined events.

In some implementations, the generative model is resident in an autonomous vehicle control system of the autonomous vehicle. In addition, in some implementations, the generative model is remote from the autonomous vehicle. In some implementations, the generative model is a generalized foundation model. Some implementations may further include periodically initiating querying of the generative model using perception data captured by the one or more perception sensors of the autonomous vehicle during operation of the autonomous vehicle to detect events during operation of the autonomous vehicle, and dynamically adjusting a rate of the periodic queries of the generative model based on an operational state of the autonomous vehicle.

In some implementations, dynamically adjusting the rate of periodic queries of the generative model based on the operational state of the autonomous vehicle includes increasing or decreasing the rate of periodic queries based on whether the autonomous vehicle is in or approaching an intersection, in or approaching a construction area, or after detection of the anomalous event. In addition, some implementations may also include generating embeddings for the perception data in the autonomous vehicle, and initiating querying of the generative model is performed remote from the autonomous vehicle and uses the embeddings. In addition, in some implementations, generating the embeddings is performed by a first head of a multi-head perception model of a perception system of the autonomous vehicle.

Some implementations may also include sequentially initiating a plurality of queries of the generative model using the perception data, the plurality of queries having increasing specificity. Some implementations may further include controlling the autonomous vehicle or another autonomous vehicle based on the identified event.

Some implementations may also include an autonomous vehicle and/or a system that is remotely located from an autonomous vehicle and includes one or more processors that are configured to perform various of the operations described above. Some implementations may also include an autonomous vehicle control system including one or more processors, a computer readable storage medium such as a memory, and computer instructions resident in the computer readable storage medium or memory and executable by the one or more processors to perform various of the methods described above. Still other implementations may include a non-transitory computer readable storage medium that stores computer instructions executable by one or more processors to perform various of the methods described above. Yet other implementations may include a method of operating any of the autonomous vehicles or autonomous vehicle control systems described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed in part to the use of generative models in the detection and/or handling of various events encountered by an autonomous vehicle during its operation. Prior to a discussion of these implementations, however, an example hardware and software environment within which the various techniques disclosed herein may be implemented will be discussed.

Hardware and Software Environment

Figure 1:
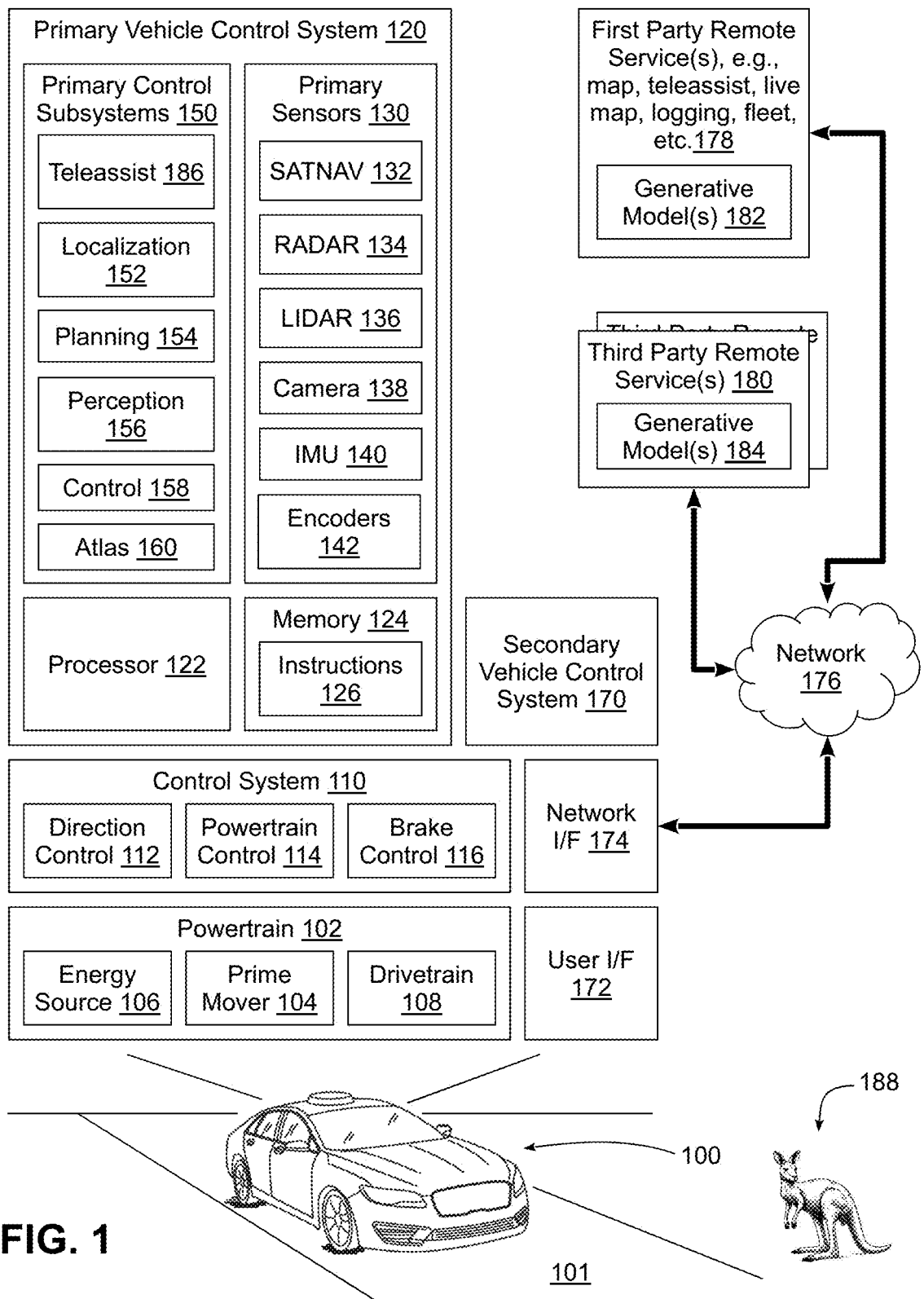
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized. In addition, vehicle 100 may be considered to be an "ego vehicle" from the perspective of its operation and control, with other vehicles in the surrounding environment (which may be autonomous vehicles or non-autonomous vehicles) considered to be "non-ego vehicles" relative to the autonomous/ego vehicle.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the technical solutions described herein are not limited to use in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as one or more digital cameras 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a trajectory or path of motion for vehicle 100 over some timeframe given a desired destination as well as the static and moving objects within the environment, while perception subsystem 156 is principally responsible for detecting, tracking, and/or identifying elements within the environment surrounding vehicle 100. Control subsystem 158 is principally responsible for generating suitable control signals for controlling the various controls in control system 110 in order to implement the planned trajectory or path of the vehicle. Any or all of localization subsystem 152, planning subsystem 154, perception subsystem 156, and control subsystem 158 may have associated data that is generated and/or utilized in connection with the operation thereof, and that which may be communicated to a teleassist system in some implementations.

In addition, an atlas or map subsystem 160 may be provided in the illustrated implementations to describe the elements within an environment and the relationships therebetween. Atlas subsystem 160 may be accessed by each of the localization, planning and perception subsystems 152-156 to obtain various information about the environment for use in performing their respective functions. Atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by autonomous vehicles may be used in other implementations, including systems based upon absolute positioning. Furthermore, it will be appreciated that at least some of the map data that is generated and/or utilized by atlas subsystem 160 may be communicated to a teleassist system in some implementations.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors, and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, a number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons, and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with various cloud-based first party remote vehicle services 178 including, for example, atlas or map services or systems, teleassist services or systems, live map services or systems, logging services or systems, fleet services or systems, etc. In addition, as illustrated in FIG. 1, vehicle 100 may also be in communication with various cloud-based third party remote services 182, which may be used, for example, to supply services to autonomous vehicle 100 and/or a first party remote service, and/or to receive notifications from autonomous vehicle and/or a first party remote service, e.g., for the purpose of notifying shippers, carriers, customers, governmental authorities, etc. of events detected by an autonomous vehicle. As will become more apparent below, one or more of such services or systems 178, 180 may utilize one or more generative models 182, 184 to perform various operations on behalf of an autonomous vehicle.

An atlas or map service or system provided as a remote service 178 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. A teleassist service or system provided as a remote service 178 may be used, for example, to provide teleassist support to vehicle 100, e.g., through communication with a teleassist subsystem 186 resident in primary vehicle control system 120, as will be discussed in greater detail below. A live map service or system provided as a remote service 178 may be used to propagate various observations collected by one or more autonomous vehicles to effectively supplement the global repository maintained by an atlas or map service or system. The terms "service" and "system" are generally used interchangeably herein, and generally refer to any computer functionality capable of receiving data from, and providing data to, an autonomous vehicle. In many instances, these services or systems may be considered to be remote services or systems insofar as they are generally external to an autonomous vehicle and in communication therewith.

As used herein, a "first-party entity" is an entity that develops, maintains, and/or controls primary vehicle control system 120, and may or may not manufacture vehicle 100 itself. Some non-limiting examples of first-party entities can include, for example, a manufacturer of primary vehicle control system 120, a dispatcher that dispatches vehicle 100 along a navigation route, a teleassist operator that can remotely control vehicle in certain situations (e.g., failure of vehicle 100, failure of certain component(s) of vehicle 100, etc.), and/or other first-party entities. Further, a "third-party entity" is an entity that is distinct from the first-party entity that develops, maintains, and/or controls primary vehicle control system 120. Some non-limiting examples of third-party entities can include, for example, a shipper associated with a payload vehicle 100 (e.g., in situations where vehicle 100 is an autonomous tractor-trailer), a carrier associated with a trailer of vehicle 100 (e.g., in situations where vehicle 100 is an autonomous tractor-trailer), a governmental authority, a service technician that performs maintenance of vehicle 100, an original equipment manufacturer (OEM) of vehicle 100 (where not also a first party), a fuel station attendant that services vehicle 100, a public serviceperson attempting to access vehicle 100 (e.g., public safety officer, transit authority, fire personnel, law enforcement, etc.), and/or other third-party entities.

Each processor illustrated in FIG. 1, as well as various additional controllers and subsystems disclosed herein, generally operates under the control of an operating system, and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module, machine learning model, or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the technical solutions described herein. Moreover, while the technical solutions described herein have and hereinafter will be described in the context of fully functioning computers and systems, it will be appreciated that the various implementations described herein are capable of being distributed as a program product in a variety of forms, and utilizing various types of computer readable media to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the technical solutions described herein should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the technical solutions described herein are not limited to the specific organization and allocation of program functionality described herein.

Those skilled in the art will recognize that the exemplary environment illustrated in FIG. 1 is not intended as limiting. Indeed, those skilled in the art will recognize that other alternative hardware and/or software environments may be used.

Autonomous Vehicle Event Detection

As noted above, a particular challenge associated with the operation of autonomous vehicles results from the inherently dynamic environment within which autonomous vehicles are expected to operate. Many autonomous vehicles, for example, rely principally on high resolution digital maps that represent the various static objects in an environment, e.g., including real world objects or elements such as roads, curbs, buildings, trees, signs, etc., as well as logical elements such as lanes, boundaries, etc., when generating trajectories to be followed. Other autonomous vehicles rely principally on perception systems (e.g., incorporating cameras, RADAR, and/or LIDAR sensors) to sense their surroundings and generate trajectories accordingly, and generally with little or no reference to any digital map. Regardless of whether one or both of these approaches is used, it is generally inevitable that an autonomous vehicle will eventually encounter a circumstance for which it has not been specifically adapted to detect and/or handle. Moreover, as the rarity of a particular circumstance increases, the costs of adapting an autonomous vehicle control system to specifically handle such a circumstance increase relative to the expected benefits.

In some implementations, one or more generative models may be utilized to assist an autonomous vehicle with the detection and/or handling of such rare circumstances. As used herein, a "generative model" can include any sequence-to-sequence based machine learning model capable of generating generative vision data, generative audio data, generative textual data, and/or other forms of generative data. Some non-limiting examples of sequence-to-sequence based machine learning models that are capable of generating one or more forms of the generative data noted above include transformer machine learning models (e.g., encoder-decoder transformer models, encoder-only transformer models, decoder-only transformer models, etc. that optionally employ an attention mechanism or some other form of memory), stable diffusion machine learning models, recurrent neural network (RNN) machine learning models, generative adversarial network (GAN) machine learning models, etc. Various sequence-to-sequence based machine learning models have demonstrated multimodal capabilities in that they are capable of processing inputs in various modalities (e.g., text-based inputs, vision-based inputs, audio-based inputs, etc.) and generating outputs in various modalities (e.g., text-based output, vision-based outputs, audio-based generative outputs, etc.). In some implementations, the generative model(s) described herein can be implemented locally at vehicle 100. In additional or alternative implementations, the generative model(s) described herein can be implemented remotely from vehicle (e.g., by high performance server(s) communicatively coupled to vehicle 100 via network(s) 176).

In some implementations, a generative model as described herein may be trained (sometimes referred to as "pre-trained") by a first-party entity for various tasks. A generative model is typically trained on enormous amounts of diverse data including data from, but not limited to, webpages, electronic books, software code, electronic news articles, machine translation data, and/or other sources of data. By training the generative model on enormous amounts of diverse data, parametric knowledge is gained such that the generative model can include hundreds of millions of parameters, billions of parameters, or even one hundred billion or more parameters (which can optionally be distilled into smaller generative models). Accordingly, a generative model can leverage the underlying data on which it was trained in performing these various tasks, such as conducting the conversations as described herein. In some versions of those implementations, the first-party entity can further perform supervised fine-tuning (SFT) and/or reinforcement learning from human feedback (RLHF) to further train and/or fine-tune the generative model for specific tasks. For example, the first-party entity can utilize supervised fine-tuning to specifically fine-tune the generative model to engage in conversations, process contextual AV data during these conversations, determine action(s) to be performed based on these conversations, etc. Additionally, or alternatively, a developer associated with the first-party entity can be "in-the-loop" during these conversations to provide a feedback signal on content generated using the generative model (e.g., conversational replies), which can be utilized to update the generative model. Further, the first-party entity may utilize various prompt engineering techniques at inference. In additional or alternative versions of those implementations, the first-party entity may forego performing any supervised fine-tuning and/or reinforcement learning from human feedback and utilize various prompt engineering techniques at inference.

In additional or alternative implementations, a generative model as described herein may be trained (or "pre-trained") by a third-party entity (e.g., in the same or similar manner described above, but based on at least some different data), but provided to a first-party entity. In some versions of those implementations, the first-party entity can further perform supervised fine-tuning and/or reinforcement learning from human feedback to further train and/or fine-tune the generative model for specific tasks (e.g., in the same or similar manner described above). Further, the first-party entity may utilize various prompt engineering techniques at inference. In additional or alternative versions of those implementations, the first-party entity may forgo performing any supervised fine-tuning and/or reinforcement learning from human feedback and utilize various prompt engineering techniques at inference.

In additional or alternative implementations, a generative model as described herein may be trained (or "pre-trained") by a third-party entity (e.g., in the same or similar manner described above, but based on at least some different data), and maintained by the third-party entity. In some versions of those implementations, the third-party entity can further perform supervised fine-tuning and/or reinforcement learning from human feedback to further train and/or fine-tune the generative model for specific tasks (e.g., in the same or similar manner described above), but using data that is specific to a first-party entity and on behalf of the first-party entity. Further, the first-party entity may utilize various prompt engineering techniques at inference. In additional or alternative versions of those implementations, the third-party entity may forgo performing any supervised fine-tuning and/or reinforcement learning from human feedback and utilize various prompt engineering techniques at inference. Notably, in these implementations, the first-party entity can make application programming interface (API) calls to a generative model that is maintained by the third-party.

In addition, in some implementations, a generative model as described herein may be considered to be a "foundation model," which may be considered to be an AI model that is trained on broad data, generally using self-supervision, containing at least a billion parameters, and applicable across a wide range of contexts. Further, in some implementations, a generative model may be considered to be a "generalized foundation model" insofar as its applicability is of a generalized nature having applicability to a wide variety of domains, as opposed to an "application-specific model" that is specifically adapted for particular applications or domains.

Figure 2:
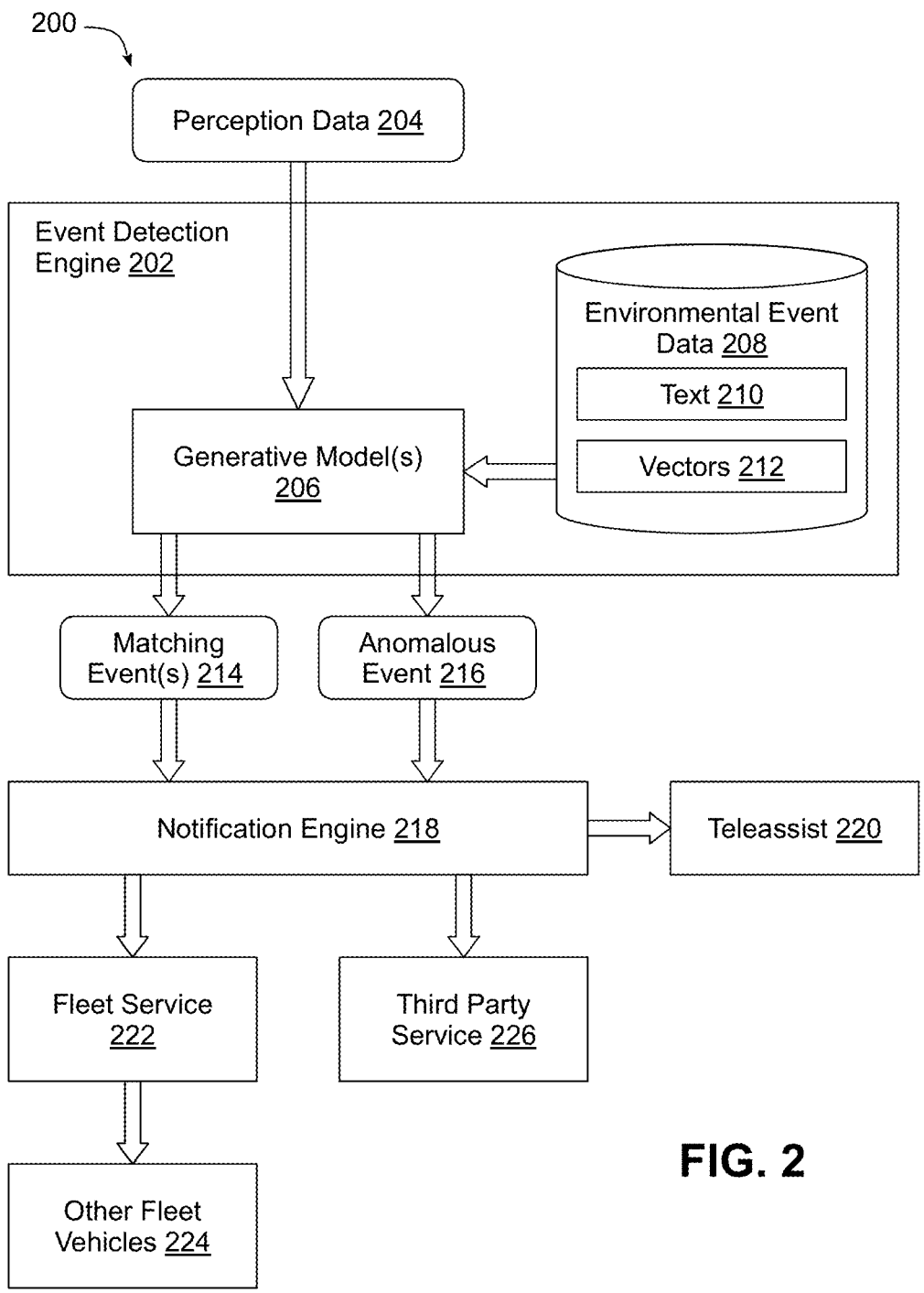
FIG. 2 is a block diagram illustrating an event detection system for an autonomous vehicle consistent with some implementations.

FIG. 2, for example, illustrates an example event detection system 200 for an autonomous vehicle, which may be used to detect events in an environment in which the autonomous vehicle operates. An "event," which may also be referred to herein as a circumstance, may be considered within the context of the disclosure to be the occurrence or absence of a particular condition in the environment within which an autonomous vehicle operates. Events may be associated with static conditions in the environment, such as the condition of a road or other infrastructure, e.g., the presence of a pothole, the presence of construction elements, issues with overpasses, bridges, toll booths, etc., as well as dynamic conditions in the environment, e.g., the presence of objects, animals, people, stopped or abandoned vehicles, etc. on the road, the shoulder, or adjacent the road; weather conditions such as rain, sleet, hail, snow, lightning, tornadoes, etc.; traffic conditions; crashes; emergency conditions; construction conditions; the presence of emergency vehicles, law enforcement vehicles, construction vehicles, etc.; the absence or presence of parking spaces; the presence of rare events such as funeral processions; etc.

It will be appreciated that an autonomous vehicle control system in some implementations may be adapted to identify or detect certain types of events, and indeed, the number and variety of events that autonomous vehicles can detect generally grows over time. Nonetheless, some events, referred to herein as anomalous events, still may occur in the environment in which an autonomous vehicle operates, but may not be detectable or identifiable by an autonomous vehicle, or in some situations, may be misidentified as another type of event. In various implementations, such anomalous events may be detected using one or more generative models.

Specifically, as illustrated in FIG. 2, system 200 may incorporate an event detection engine 202 that receives perception data 204 from one or more perception sensors for processing by one or more generative models 206. In various implementations, engine 202 may be implemented within an autonomous vehicle control system or a remote service in communication with an autonomous vehicle control system, or the functionality thereof may be distributed among an autonomous vehicle control system and one or more remote services.

In some implementations, some perception data may include raw perception data collected from one or more perception sensors of an autonomous vehicle (e.g., one or more cameras or image sensors, one or more LIDAR sensors, one or more RADAR sensors, etc.). In some implementations, some perception data may be processed and/or otherwise derived from raw perception data, e.g., provided as an output of one or more perception models that process raw perception data to generate semantic content as to objects and/or entities in the environment perceived by the perception sensors. It will be appreciated that at least some of the time, the perception data may include perception data associated with one or more perceived events that have occurred during the operation of the autonomous vehicle. In some implementations, the perception data may also include data from other sensors in an autonomous vehicle, e.g., audio data captured by one or more microphones, inertial measurement data captured by one or more inertial measurement units, temperature data captured by one or more temperature sensors, pressure sensor data captured by one or more pressure sensors, etc.

In the implementation illustrated in FIG. 2, engine 200 also utilizes environmental event data 208 that represents a set of predetermined events that are capable of occurring in the environment, and that, in some implementations, are events for which the autonomous vehicle control system is adapted to detect or identify, and in some instances, to handle in a predetermined manner. In other implementations, the set of predetermined events may include events for which an autonomous vehicle control system is specifically adapted.

The environmental event data 208 may be represented in a number of manners, e.g., in the form of text embeddings 210 and/or vector embeddings 212. The embeddings may be generated, for example, using vehicle logs collected from autonomous vehicles to build a database of events, which in some implementations may include events of differing degrees of rareness. A rare event, in this regard, may be considered to be an event that occurs with a frequency below a particular threshold, such that, for example, it may, in some implementations, not necessarily be detectable or identifiable by an autonomous vehicle control system. It will be appreciated, for example, that autonomous vehicle control systems are necessarily resource constrained with respect to onboard computing resources, so it may be the case that an autonomous vehicle control system may not be adapted to detect, identify, and/or handle some events that occur below some particular frequency in order to provide computing bandwidth for handling other, higher priority operations.

On the other hand, it may be desirable in some implementations to limit environmental event data to exclude relatively frequently occurring events, or to otherwise obtain a balance such that the frequency of events and variety of events detected by event detection engine 202 does not result in the identification of too many events during the operation of an autonomous vehicle.

Event detection engine 202 may be configured to initiate one or more queries to one or more generative models 206 using a combination of perception data 204 and environmental event data 208 to cause the generative model(s) 206 to output one or more events, e.g., one or more matching events 214 and/or one or more anomalous events 216. In addition, as will become more apparent below, additional on-board and/or remote models, which are not necessarily generative in nature, may be used in connection with event detection as described herein.

Initiating a query may, for example, include the generation and communication of a query request directly to a generative model to cause the generative model to output response data in response to the query request. In addition, initiating a query may, in some implementations, include the generation and communication of a query request to a remote service or server that ultimately causes a suitable query request to be issued to a generative model to cause the generative model to output response data in response to the query request, which is then returned via the remote service or server. It will also be appreciated that a query request may vary in format, and may be modified or adapted during communication between different computers and/or services, such that a query request issued to a remote service may result in the generation of a different query request in a format suitable for consumption by the generative model. It will also be appreciated that while environmental event data 208 is considered to be an input to the generative model(s) 206, such event data may not necessarily be provided with a query request, and may, for example, be locally accessible to the generative model(s) and retrieved on demand in response to a query request.

A matching event 214 may be considered to be an event among the set of predetermined events in the environmental event data that is detected in the perception data from the one or more queries to the one or more generative models 206. An anomalous event 216, in contrast, may be considered to be an event that is detected in the perception data from the one or more queries to the one or more generative models 206, but that is not among (i.e., distinct from) the set of predetermined events in the environmental event data. In addition, while event detection engine 202 is illustrated in FIG. 2 as outputting both matching and anomalous events, in some implementations event detection engine 202 may output only anomalous events.

Each of events 214, 216 may be provided to a notification engine 218, which in some instances may be on-board an autonomous vehicle, and may be capable of generating one or more notifications in response to detection or identification of an event. The notifications may be consumed by various entities, e.g., components or engines in an autonomous vehicle control system (e.g., a teleassist component 220 of a teleassist system to initiate a teleassist session, or other components suited to handle the event(s) associated with a notification), as well as various remote services or servers. For example, it may be desirable to generate a notification for a fleet service 222 to enable the fleet service to notify one or more other fleet vehicles 224 of the occurrence of the event. It may also be desirable to generate a notification for one or more third party services 226, e.g., governmental services (including, for example, first responders, law enforcement, etc.), carrier services, shipper services, maintenance services, etc., to enable the event to be propagated for consumption by other entities.

The notification of remote services or servers, for example, may be utilized to provide a distributed form of road intelligence, and enable, for example, information about the current state of the environment to be distributed to various interested entities, e.g., information about current weather conditions, road conditions, traffic conditions, construction conditions, hazardous conditions, infrastructure conditions, etc. As such, services 222, 226 in some implementations may be considered to be types of distribution services that propagate events and other road intelligence to various entities external to an autonomous vehicle. Further, through the participation of multiple autonomous vehicles operating in the same environment, highly localized information may be collected and distributed in some implementations, thereby enabling, for example, current weather and traffic information to be collected at a high level of detail and granularity, as well as notification of governmental and other entities of potentially hazardous situations such as crashes, stopped vehicles and/or stranded motorists on the shoulder, objects/animals/people/stopped vehicles in the road, potholes in the road, etc.

Furthermore, the generation of a notification may result in an autonomous vehicle control system in an autonomous vehicle from which the perception data was collected, or another autonomous vehicle (e.g., in the same fleet) to control the operation of the autonomous vehicle responsive to the notification, and thus, responsive to the detection or identification of a matching and/or anomalous event. The detection or identification of an event, for example, may cause an autonomous vehicle control system to select a different route, select a different trajectory, change the speed or state, or otherwise alter the operation of the autonomous vehicle relative to the operation of the autonomous vehicle that would have resulted were the event not detected.

Figure 3:
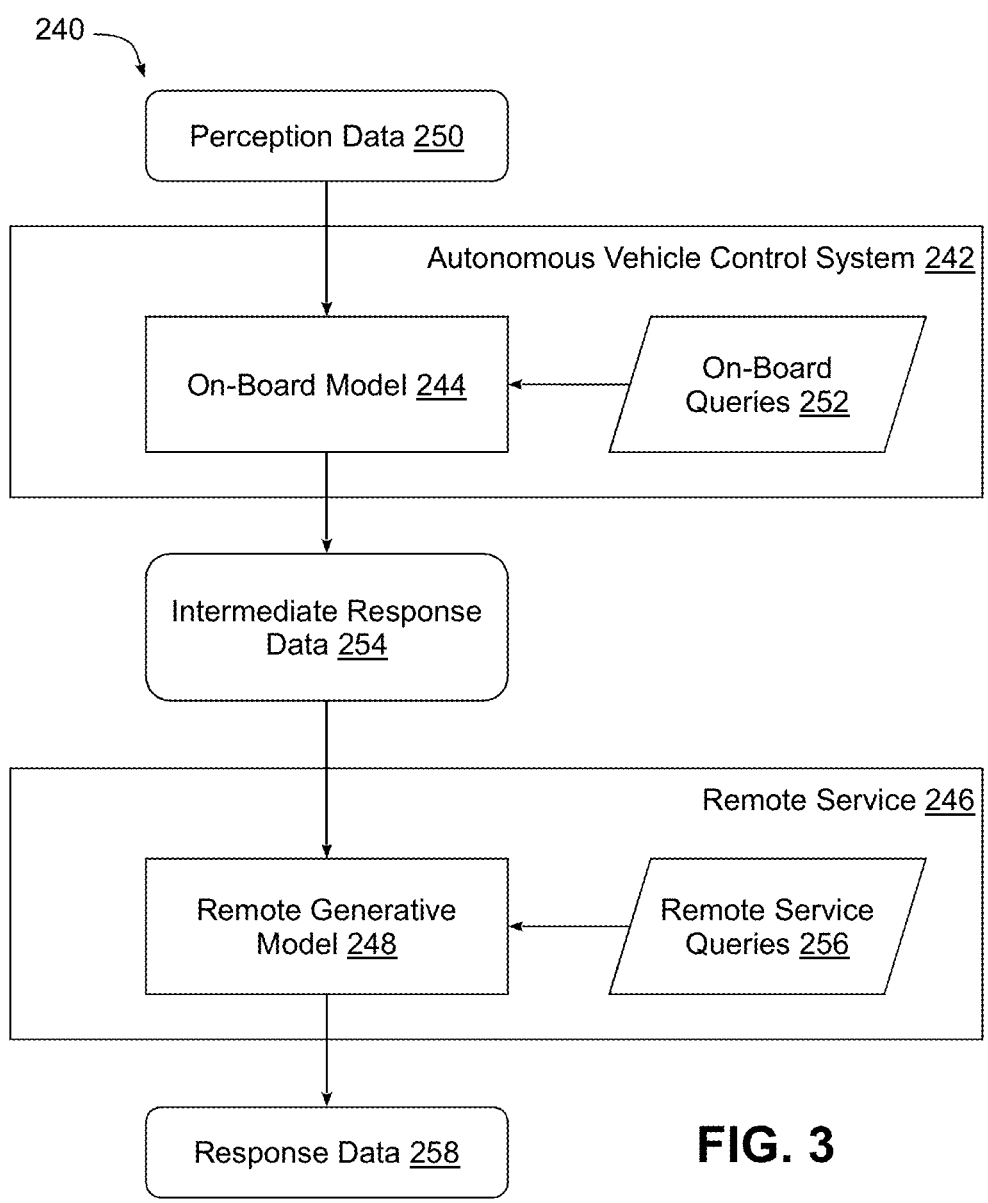
FIG. 3 is a block diagram illustrating an example implementation of an event detection engine consistent with some implementations.

Now turning to FIG. 3, as noted above, an event detection system may initiate queries to multiple models (including in some instances multiple generative models) when detecting events in some implementations. FIG. 3, in particular, illustrates a distributed implementation of an event detection engine 240 in which event detection functionality is distributed between a local or on-board component and a remote component, specifically an autonomous vehicle control system 242 incorporating an on-board model 244, and a remote service 246 incorporating a remote generative model 248. In this implementation, perception data 250 is initially used to initiate one or more on-board queries 252 to on-board model 244, resulting in the generation of intermediate response data 254 that is subsequently provided to remote service 246 to initiate one or more remote service queries 256 to remote generative model 248 to generate response data 258.

It will be appreciated that not every query initiated to on-board model 244 may necessarily result in initiation of a query to remote generative model 248, as in some instances local queries may be sufficient to process the perception data without the need for utilizing the remote service. Moreover, it will be appreciated that the intermediate response data 254 provided to remote service 246 may, in some instances, incorporate at least portion of perception data 250, such that models 244, 248 are queried using at least some of the same perception data.

The response data 254, 258, in general, may incorporate any data suitable for downstream consumption, including, for example, the identification of matching and/or anomalous events, marked up perception data (e.g., marked up images) indicating what precipitated detection of an event, a textual or vector description of the perception data (e.g., a textual or vector description of an image), or other data suitable for use in handling an identified event. In addition, as noted above, intermediate response data 254 may also incorporate perception data and/or any other data suitable for initiating a query to remote generative model 248 in connection with event detection.

It will also be appreciated that remote service 246 need not necessarily host remote generative model 248, and may instead access remote generative model 248 over a network. For example, where remote service 246 is a first-party remote service and remote generative model 248 is a third-party generative model hosted by a third-party remote service, initiation of a query to remote generative model 248 may be made via an API supported by the third-party remote service.

In some implementations, the multiple models 244, 248 may be used in a primary/secondary or secondary/primary manner, e.g., such that model 244 is initially queried and model 248 is optionally queried based on the response of model 244, and model 248 confirms or rejects a response of model 244 (or vice versa). In addition, in some implementations, the multiple models 244, 248 may be queried sequentially or in parallel. Further, in some implementations, multiple queries may be initiated in one or both of models 244, 248. For example, as discussed in greater detail below, in some implementations, queries of increasing specificity may be initiated in model 244 and/or model 248, e.g., queries that effectively ask "is anything peculiar or weird in this image" followed by more specific follow-up queries based on the model response, much as in the manner of conducting a dialog with the model. In addition, in some implementations models 244, 248 may be queried using different input data, e.g., to balance performance issues by performing lower overhead queries locally and followed by higher overhead queries as needed based on the response to the lower overhead queries. In some implementations, for example, an initial query may be implemented using textual data or embeddings with a follow-up query to the same or a different model implemented using vector embeddings. It may be desirable in some implementations, for example, to query on-board model 244 using text embeddings, and to query remote generative model 248 using vector embeddings, such that the higher overhead vector-based queries are handled by the remote service and the lower overhead text-based queries are handled by the typically resource-constrained autonomous vehicle control system. Beyond reducing the computational overhead in the autonomous vehicle control system, such an approach has an additional technical advantage in that some follow-up queries to the remote service may be avoided altogether based on the results of the initial queries, thereby further reducing communication and/or computational overhead in both the autonomous vehicle control system and the remote service.

In some implementations, for example, it may be desirable to utilize as on-board model 244 a comparatively lower overhead generative model such as a multi-modal vision and language model, e.g., based on contrastive training of image understanding and text understanding models, and utilize as remote generative model 248 a comparatively higher overhead generative model such as a generalized foundation model. With each model, perception data, e.g., image data, may be fed to the model in connection with specific text queries and/or environmental event data (e.g., as described above in connection with FIG. 2) to generate an output such as text or vector embeddings (e.g., text tokens) that describe the scene depicted in the perception data and/or indicate whether any enumerated events have been detected.

Figure 4:
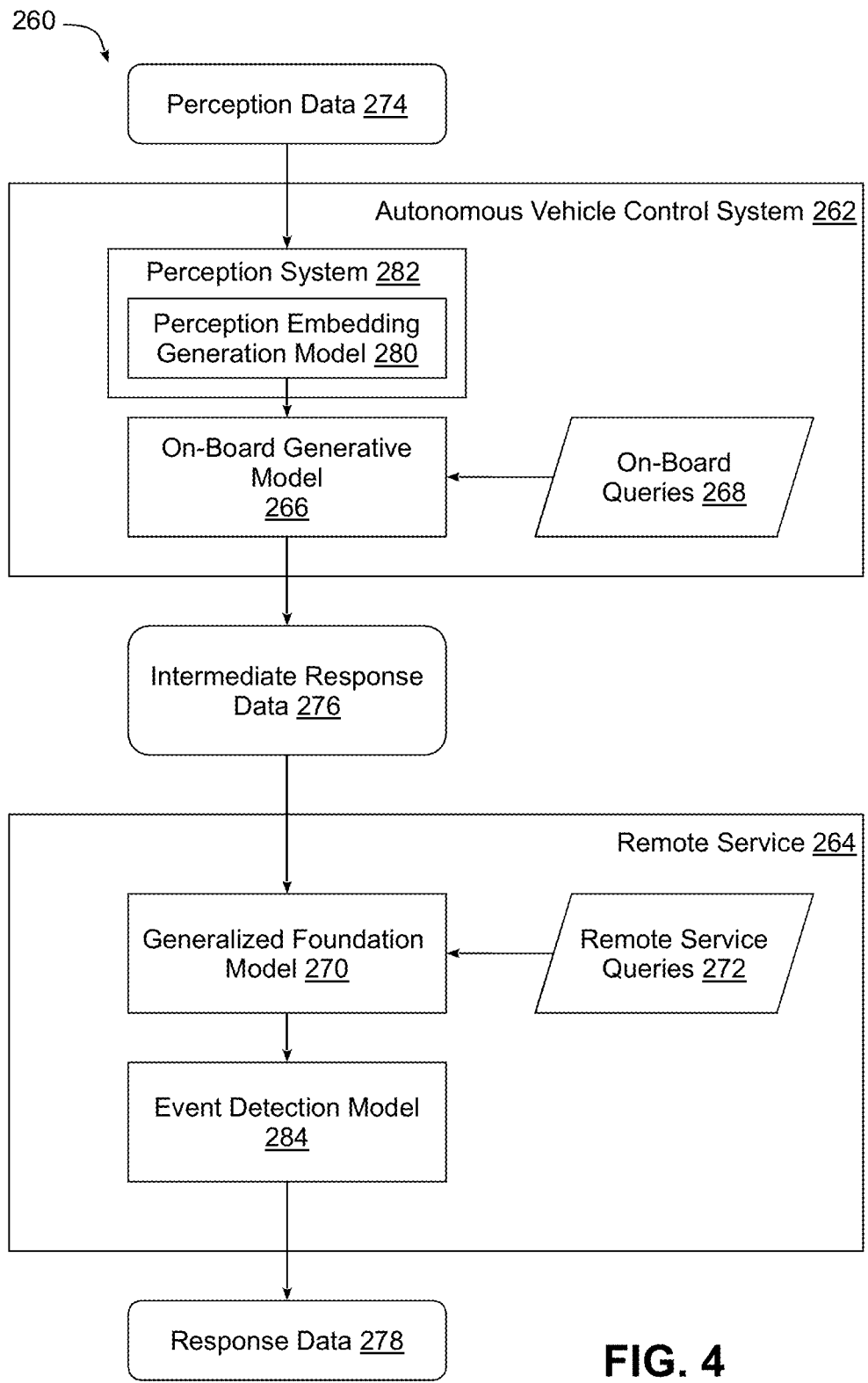
FIG. 4 is a block diagram illustrating another example implementation of an event detection engine consistent with some implementations.

It will also be appreciated that various additional techniques may be utilized to reduce the computational and/or communication overhead associated with event detection as described herein. FIG. 4, for example, illustrates a distributed event detection engine 260 incorporating an on-board component implemented in an autonomous vehicle control system 262 and a remote component implemented in a remote service 264. Similar to event detection engine 240 of FIG. 3, event detection engine 260 utilizes an on-board model (e.g., an on-board generative model 266) that receives on-board queries 268 (which in some instances may include environmental event data) and a remote generative model (e.g., a generalized foundation model 270) that receives remote service queries 272 (which in some instances may include environmental event data). In addition, similar to event detection engine 240, perception data 274 is received by autonomous vehicle control system 262, intermediate response data 276 is communicated from autonomous vehicle control system 262 to remote service 264, and response data 278 is output by remote service 264.

In addition, engine 260 includes, in autonomous vehicle control system 262, a perception embedding generation model 280 disposed within a perception system 282. Model 280 may be used to generate embeddings from perception data 274, e.g., text or vector embeddings that effectively describe what is depicted in the perception data. By doing so, the bandwidth required to communicate the perception data to a remote service for querying generalized foundation model 270 may be substantially reduced and/or the depth of the information provided to the generalized foundation model may be substantially greater.

As an example, in some implementations, querying of a remote generative model may be implemented by communicating images captured by a single on-board camera or image sensor to a remote generative model on a periodic basis. However, by generating embeddings of the perception data, the bandwidth required to communicate images to the remote generative model may be substantially reduced compared to communicating the images as raw perception data. By doing so, the overall bandwidth requirements per query to the remote generative model may be reduced in some implementations, thereby saving communication and computational resources on a per query basis. Alternatively, in some implementations, the reduced bandwidth requirements may be utilized to increase the frequency of queries and/or the amount of information incorporated into individual queries while staying within a similar bandwidth envelope. For example, in some implementations, the rate of querying may be increased to provide quicker and more timely responses to events encountered during operation of an autonomous vehicle. As another example, in some implementations, queries to a remote generative model may incorporate images captured by multiple on-board cameras, LIDAR and/or RADAR sensors (including those having differing fields of view), thereby potentially improving the ability to detect various events around the autonomous vehicle.

Furthermore, the output of perception embedding generation model 280 in some implementations may include both text and vector embeddings describing the perception data such that lower overhead text embeddings may be used for on-board queries while higher overhead vector embeddings may be used for remote service queries. It will be appreciated, for example, that vector embeddings, as compared to text embeddings, may generally be larger in size and have greater storage requirements, and may fuse together a greater number of input elements, so the computational, storage, and communication overheads associated with vector embeddings are generally greater than those of text embeddings. As such, text embeddings may be used to reduce the computational overhead of on-board queries in a resource constrained environment such as an autonomous vehicle control system, while queries utilizing higher overhead vector embeddings may be handled using the comparatively greater resources available in a remote service. Moreover, as some on-board queries may avert the need for follow-up remote service queries in some instances, the overall number of remote service queries may be reduced, thus further saving at least some of the computational, storage, and/or communication overhead associated with handling remote service queries.

In some implementations, models 266 and 280 may effectively be implemented using a single model, whereby, for example, a model resident in perception system 282 both generates embeddings representing the perception data (e.g., for use by remote service 264) and attempts to identify events responsive to specific queries and/or based on environmental event data representing a set of predetermined events to locally identify particular events and/or locally detect anomalous events that are distinct from a set of predetermined events, or alternatively, that are distinct from a set of events for which the model is specifically trained to detect.

In addition, engine 260 includes a hybrid model architecture whereby generalized foundation model 270 is coupled to a downstream event detection model 284 that is trained to consume the outputs of generalized foundation model 270 (e.g., various types of embeddings) and identify specific events from the generalized output. It will be appreciated, for example, that the generalized nature of foundation model 270 is by design intended to apply to a wide variety of end use applications, and may output responses that are highly generalized. By training a downstream model (e.g., a first-party model) to consume these outputs in a manner suitable for use in connection with autonomous vehicle event detection, however, responses may be more specifically tailored for such an application. In some implementations, for example, a downstream model may be trained to refine the output of the generalized foundation model by identifying various rare events capable of being represented in the output of generalized foundation model 270.

It will also be appreciated that models 270, 284 may be hosted in different remote services, so while both are illustrated in remote service 264 in FIG. 4, different remote services may be used to host each model in other implementations. In addition, it will be appreciated that training and implementation of a downstream application-specific model to consume the output of a generalized foundation model would be well within the abilities of one of ordinary skill having the benefit of the instant disclosure.

Figure 5:
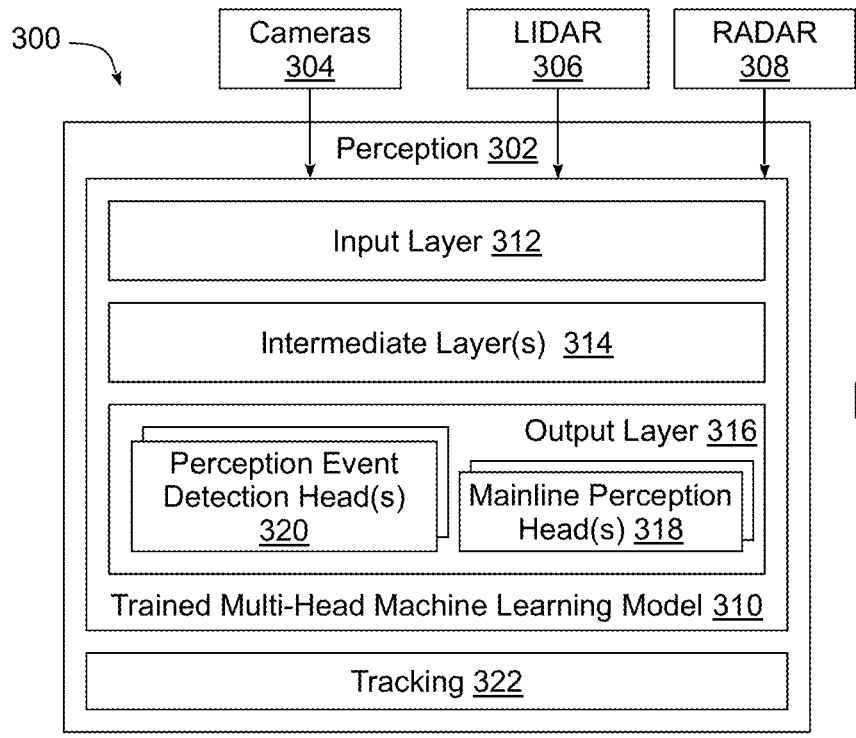
FIG. 5 is a block diagram illustrating an example perception system incorporating a multi-head machine learning model consistent with some implementations.

FIG. 5 next illustrates one example manner of implementing an on-board model utilized in connection with event detection in some implementations, such as, for example, any of models 206, 244, 266, or 280 of FIGS. 2-4. FIG. 5, in particular, illustrates an example autonomous vehicle control system 300 including a perception component or system 302 that receives as input perception data, e.g., as captured by one or more cameras or image sensors 304 (e.g., cameras with forward-facing, side-facing and/or rearward-facing fields of view), LIDAR data, e.g., as captured by one or more LIDAR sensors 306, and/or RADAR data, e.g., as captured by one or more RADAR sensors 308. Each of sensors 304, 306, 308 may be positioned on an autonomous vehicle to sense the roadway upon which the autonomous vehicle is disposed.

Perception component 302 includes a trained multi-head machine learning model 310 is configured to, in part, detect various objects or elements in the environment, as well as various environmental conditions and/or events (collectively referred to herein as circumstances) occurring in the environment surrounding the vehicle. In some implementations, for example, trained multi-head machine learning model 310 may be implemented as a deep neural network (DNN) including an input layer 312, one or more intermediate layers 314, and an output layer 316 including one or more mainline perception heads 318 and one or more event detection heads 320. In some implementations, for example, one or more intermediate layers 314 may include one or more convolutional layers. The dimensions/shape of input layer 312 may be dependent on the shape of the perception data to be applied, while the dimensions/shape of each output head 318, 320 may be dependent on various factors such as how many class probabilities are to be predicted, among others. In some implementations, multiple convolution layers may be provided, and max pooling and/or other layers such as affine layers, softmax layers and/or fully connected layers may optionally be interposed between one or more of the convolution layers and/or between a convolution layer and the output layer. Other implementations may not include any convolution layer and/or not include any max pooling layers, and in still other implementations, other machine learning models may be used, e.g., Bayesian models, random forest models, Markov models, etc.

Each perception event detection head 320, for example, may be configured to identify various circumstances that may be encountered by an autonomous vehicle. In some implementations, one or more of heads 320 may also be configured to identify anomalous events, i.e., circumstances that cannot be identified, in some instances as a result of being events that are distinct from a set of events for which the event detection head is trained to detect. In some implementations, for example, a perception event detection head may output different formats of embeddings formatted to indicate when circumstances can or cannot be identified, which in some instances may subsequently be input to a generative model in connection with anomalous event detection and/or identification. In some implementations, a perception event detection event may output embeddings formatted to describe at least a portion of the perception data associated with a detected circumstance or event, which may subsequently be input to a generative model in connection with anomalous event detection and/or identification.

In addition, a tracking module 322 may include one or more trackers capable of generating tracks for the various detected objects over multiple frames. Trackers may render predictions of how existing tracks would appear in the sensor and then compare that rendering to incoming sensor data. When appropriate, the trackers may publish updates, which define a function that adjusts the track to better agree with the sensor data. Some of the trackers may also publish proposals for new tracks. The trackers may also be responsible for deleting tracks once they leave the sensors' field of vision (FOV) and are no longer perceived. In the illustrated implementation, for example, each tracker may take sensor data or the output of sensor data processing ("virtual" sensor data in the form of detections) as input, obtain existing tracks at the latest time before the time of the incoming measurements, associate relevant subsets of the sensor data or detections to the tracks, produce state updates for tracks with associated measurements, optionally generate proposals for new tracks from unassociated sensor data or detections, and publish updates and/or proposals for consumption by a track manager in the tracking module. In other implementations, some or all of the tracking may be integrated into model 310, rather than being implemented in a separate module.

In some implementations, multi-head machine learning model 310 may in part also implement a unified boundary machine learning model capable of detecting multiple types of boundaries using one or more of mainline perception heads 318. Moreover, by utilizing a multi-head machine learning model, reduced system-level computation and memory usage, as well as joint optimization of all functions as well as optimization of contextual interactions between different boundary/object types, may be provided. Model 310 in particular may integrate detection of perceived boundaries associated with a plurality of semantic boundary types for a roadway. A semantic boundary type, within the context of the disclosure, may be considered to refer to a particular classification of boundary within a schema of detectable boundary types. Boundary types in some implementations may be classified based upon whether they are physical or virtual (i.e., whether or not they represent a continuous physical barrier constraining autonomous vehicle movement), whether they are actual or logical (i.e., whether they represent actual physical objects in the environment that an autonomous vehicle should avoid or they represent a logical construct that, for example, for legal or regulatory reasons, they are required to obey), and/or based upon other classifications. For example, a physical barrier such as a guardrail, jersey barrier or permanent concrete barrier may be associated with a physical barrier semantic boundary type, and a painted or taped line on the surface of the roadway that forms the boundary of a lane may be associated with a painted lane semantic boundary type. Likewise, a road edge, e.g., at the boundary between the road and a curb, median, a gravel shoulder, or other non-drivable surface that delineates the edge of the drivable area of a roadway may be associated with a road edge semantic boundary type.

Still other boundary type classifications may be based, for example, upon whether they are permanent or temporary/construction in nature, and in some instances, boundary types may be classified with finer granularity, e.g., to distinguish between guardrails and concrete barriers, between different types of road edges, between different types of painted lane boundaries (e.g., yellow vs. white, single dashed, single solid, double solid, solid and dashed), etc. In other implementations, however, detection of perceived boundaries may be implemented in other manners, e.g., external to perception component or system 302 or in one or more separate machine learning models from multi-head machine learning model 310.

Figure 6:
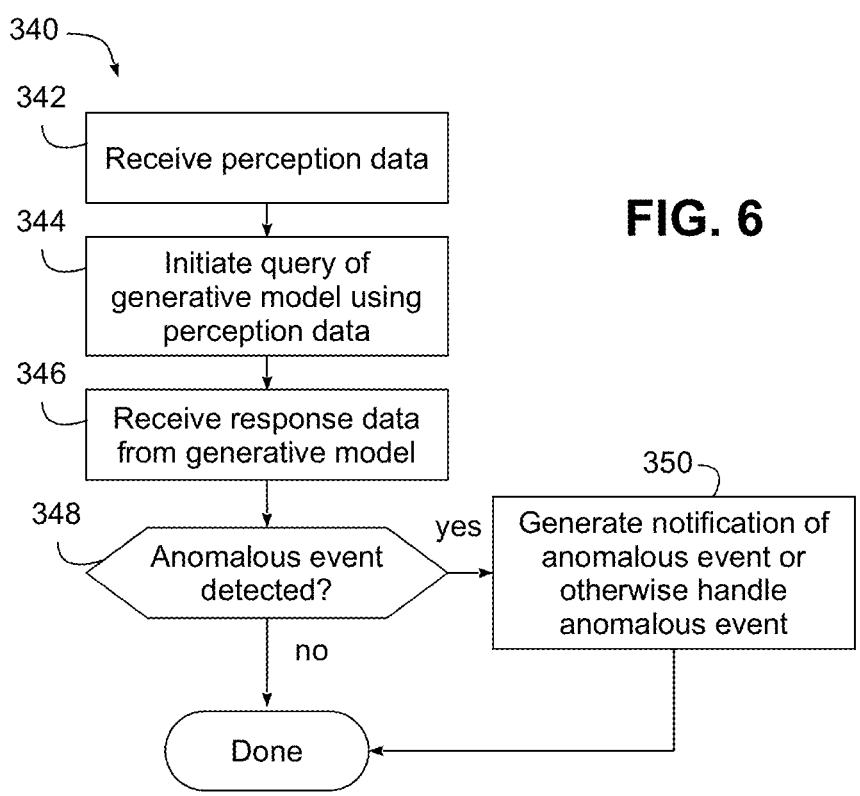
FIG. 6 is a flowchart illustrating an example operational sequence for detecting anomalous events consistent with some implementations.

Now turning to FIG. 6, as noted above, in some implementations an event detection system may be configured to identify anomalous events, whether instead of or in addition to specific events for which the event detection system is specifically adapted to detect. FIG. 6 in particular illustrates an operational sequence 340 for identifying anomalous events using any of the event detection systems illustrated in FIGS. 2-5. Operational sequence 340, for example, may begin by receiving perception data in block 342, and using the perception data, initiating a query of a local or remote generative model in block 344. Response data may then be received from the generative model in block 346, and based on the response data, a determination may be made in block 348 as to whether any anomalous event has been detected. If so, control may pass to block 340 to generate a notification of the anomalous event and/or otherwise handle the autonomous event (e.g., by varying the control of the autonomous vehicle, initiating a teleassist session, or in other manners that will be apparent to one of ordinary skill in the art having the benefit of the instant disclosure).

Figure 7:
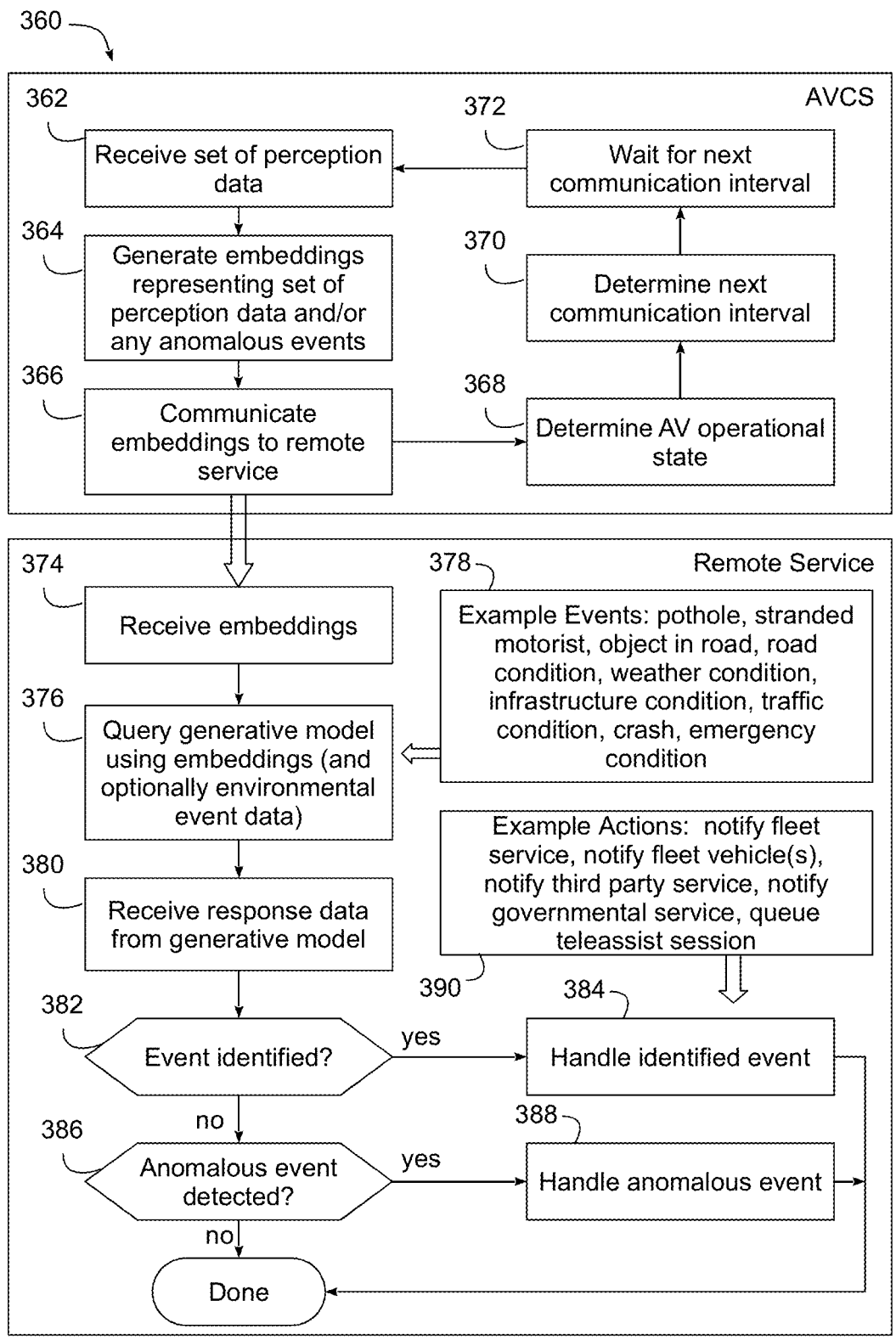
FIG. 7 is a flowchart illustrating an example operational sequence for detecting events using an autonomous vehicle in communication with a remote service consistent with some implementations.

FIGS. 7-12 next illustrate various other operational sequences that may be implemented using any of the event detection systems illustrated in FIGS. 2-5. FIG. 7, for example, illustrates an operational sequence 360 that is implemented in parts by an autonomous vehicle control system and one or more remote services, and that utilizes in part a dynamically varying rate of querying of one or more generative models.

It will be appreciated, for example, that due to the communication and computational overhead associated with querying a generative model (particularly a generative model that is remote to an autonomous vehicle), it may be desirable in some implementations to vary that rate at which data is communicated to a generative model and/or the rate at which a generative model is queried. In particular, it will be appreciated that in certain circumstances, an autonomous vehicle may be operating under conditions in which the usefulness of event detection can vary. For example, event detection may not be as useful when an autonomous vehicle is stopped, parked, or traveling at a fixed speed on a relatively straight section of road, particularly when there is relatively light traffic nearby. Conversely, when an autonomous vehicle is in or approaching an intersection or in or approaching a construction area, the potential for hazardous events arising may be greater. Further, after an event has been detected, it may be useful to increase the rate of event detection to provide greater responsiveness, as well as to potentially detect the end of an event. In addition, where an event is associated with a teleassist session, it may be desirable to vary the rate of event detection in advance of and/or during the teleassist session, e.g., to provide enhanced event detection for use by a teleassist operator.

As such, operational sequence 360 may include a set of operations represented by blocks 362-372 and performed in an autonomous vehicle control system to dynamically vary a rate of communication of perception data to a remote service, which necessarily dynamically varies the rate at which a generative model is queried in connection with event detection.

Block 362, for example, receives a set of perception data, and block 364 generates embeddings representing the set of perception data and/or any anomalous events, e.g., if anomalous event detection is performed locally in the autonomous vehicle control system, similar to the on-board embedding generation and event detection operations discussed above in connection with FIG. 4.

Next, in block 366, the generated embeddings are communicated to the remote service. Block 368 then determines an operational state for the autonomous vehicle. The operational state, for example, may be based on the location, trajectory, speed, and/or acceleration/deceleration of the autonomous vehicle and/or based on other factors such as the autonomous vehicle's location relative to known hazards such as intersections, construction areas, etc. The operational state may also be based on additional factors such as whether an event has recently been detected, whether the autonomous vehicle is queued for or currently participating in a teleassist session, or other factors that will be apparent to those of ordinary skill in the art having the benefit of the instant disclosure. In addition, it will be appreciated that the operational state may also be based at least in part on information received from the remote service (e.g., whether an event has recently been detected).

Based on the operational state of the autonomous vehicle, block 370 next determines a next communication interval, i.e., the next time to communicate embeddings to the remote service to trigger another event detection cycle during which one or more generative models are queried. Control then passes to block 372 to wait for the next communication interval, and control returns to block 362 when the next communication interval has been reached. Therefore, it will be appreciated that an autonomous vehicle may operate with a varying delay between each event detection cycle depending on the current operational state of the autonomous vehicle. It will also be appreciated that a wide variety of other aspects of an operational state may be used to dynamically vary the rate. Furthermore, while the rate of communication of perception data embeddings in FIG. 7 can control the rate of queries to a generative model, it will be appreciated that different rates may be used for both operations, and in the case of on-board querying of a generative model, no dynamic control over the communication rate may be used.

As also illustrated in FIG. 7, in some implementations event detection and handling may be implemented principally remote from an autonomous vehicle. In particular, in response to each communication of perception data embeddings, a remote service may receive the embeddings in block 374 and query a generative model using the embeddings (and optionally, environmental event data as described above) in block 376. As illustrated in block 378, the types of events that may be represented in the environmental event data may include events such as potholes in the road, stranded motorists, objects in the road, road conditions, weather conditions, infrastructure conditions, traffic conditions, crashes, emergency conditions, or any of the other various event types discussed above.

Next, in block 380, response data is received from the generative model, and in block 382, it is determined whether an event has been identified (e.g., if the response data specifies a particular matching event from the environmental event data). If so, control passes to block 384 to handle the identified event. Likewise, block 386 determines if an anomalous event has been detected (e.g., if the response data specifies that no match was found with any event from the environmental event data). If so, control passes to block 388 to handle the autonomous event. In various implementations, only one of blocks 382, 386 may be implemented in the alternative.

Handling of a detected event in blocks 384, 388 may be implemented in different manners in different implementations. Example actions that may be implemented are illustrated in block 390, including, but not limited to, notifying a fleet service of the event, notifying one or more fleet vehicles of the event, notifying a third party service, notifying a governmental service, queueing a teleassist session, etc.

Figure 8:
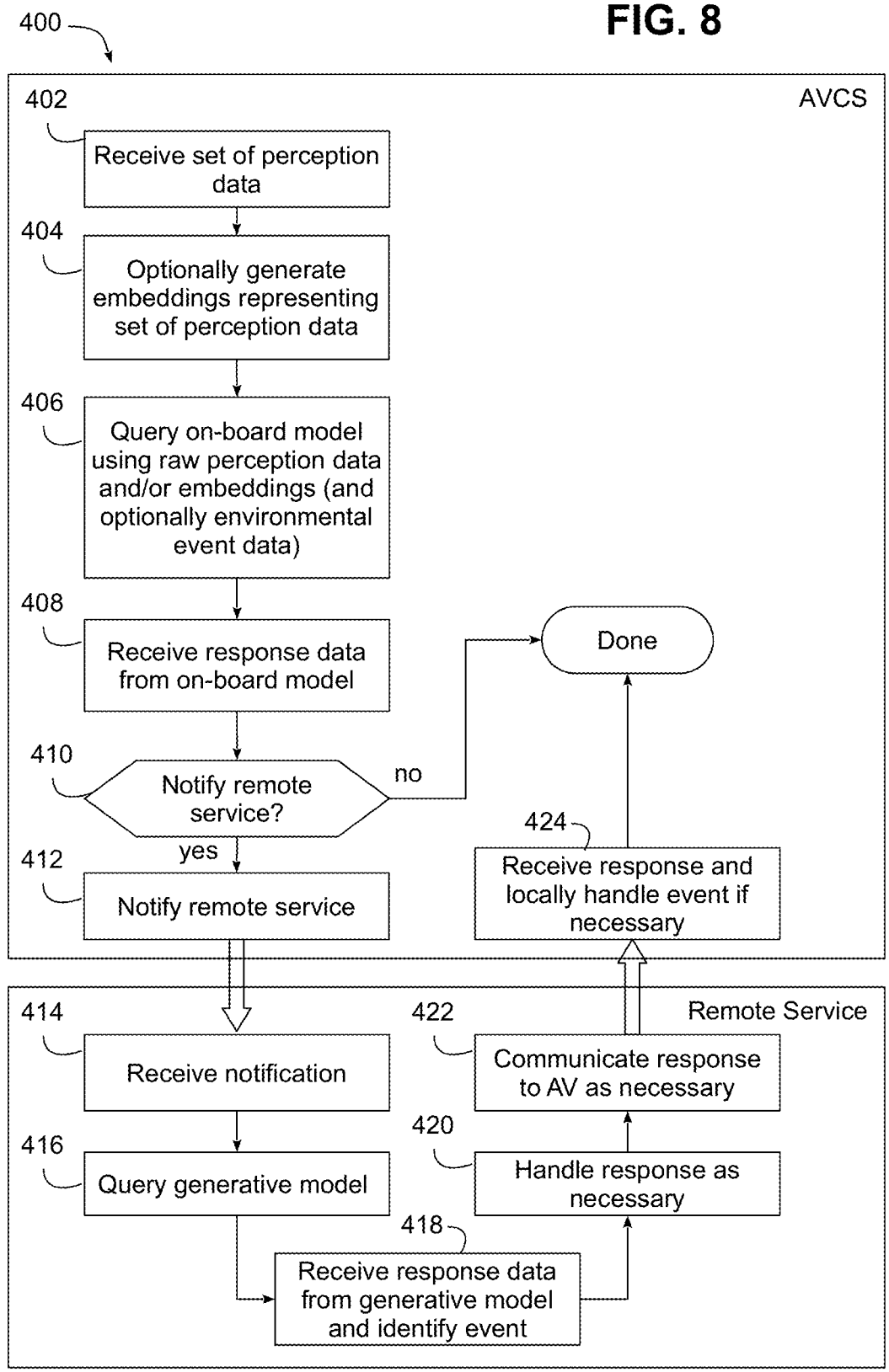
FIG. 8 is a flowchart illustrating another example operational sequence for detecting events using an autonomous vehicle in communication with a remote service consistent with some implementations.

FIG. 8 illustrates another operational sequence 400 that is implemented in parts by an autonomous vehicle control system and one or more remote services, and that utilizes multiple queries or steps in connection with event detection.

In block 402, a set of perception data is received, and in block 404 embeddings are optionally generated to represent the set of perception data, e.g., as discussed above in connection with FIG. 4. Next, in block 406, an on-board model, e.g., a generative model or a perception model incorporating event detection capabilities as discussed above in connection with FIG. 5, is queried, using raw perception data and/or the aforementioned embeddings, and optionally using environmental event data. In block 408, response data is received from the on-board model, and in block 410 a determination is made as to whether to notify the remote service. For example, in some implementations, it may be determined that no event has been detected, or that a detected event can be handled locally and does not require further processing by the remote service. In some implementations, for example, the remote service may be notified in connection with determining that a detected event is an anomalous event.

If no notification of the remote service is required, sequence 400 is complete, otherwise, control passes to block 412 to notify the remote service, as well as to communicate any embeddings, perception data, response data (received in block 408) or other suitable information to the remote service in connection with the notification. The notification (and associated data) is received in block 414, and a generative model is queried in block 416. Response data is then received from the generative model in block 418, and the response is handled as necessary by the remote service in block 420. In addition, the response is optionally communicated to the autonomous vehicle in block 422, which is then handled in the autonomous vehicle control system as appropriate in block 424. It will be appreciated that handling of the response in the remote service and/or in the autonomous vehicle may be implemented in different manners as discussed above, and may include one or more of notifying a fleet service and/or third-party service, initiating a teleassist session, controlling the autonomous vehicle responsive to the event, or in other manners as described above.

Thus, it will be appreciated that in some implementations, event detection may occur in multiple steps, and in some instances, may omit downstream steps such as contacting a remote service in order to reduce computational and/or communication overhead.

Figure 9:
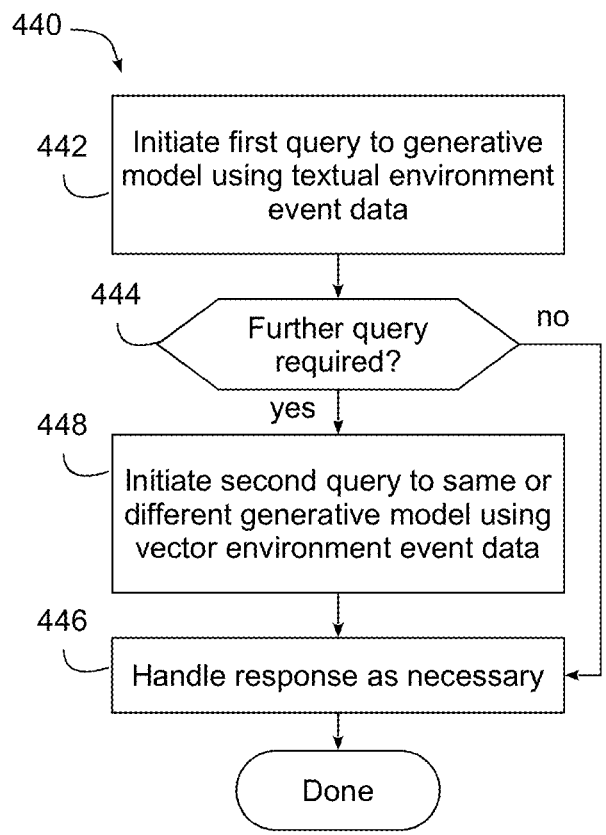
FIG. 9 is a flowchart illustrating an example operational sequence for initiating multiple queries to one or more generative models in connection with detecting events consistent with some implementations.

FIG. 9 illustrates another operational sequence 440 that incorporates multiple steps in connection with event detection. In particular, it will be appreciated that different types of queries to generative models may utilize different amounts of computational resources. Text-based queries of generative models, for example, generally utilize less computational resources than vector-based queries, while vector-based queries may provide superior results (e.g., more accurate results, reduced erroneous results, etc.) in many instances. As such, in some implementations, it may be desirable to defer vector-based queries in favor of text-based queries and then utilize vector-based queries when additional processing is desired.

Thus, in operational sequence 440, a first query to a generative model is initiated in block 442 using textual environmental event data, e.g., as described above in connection with FIG. 2. Then, based on the results of the query, block 444 may determine whether a further query is required, and if not, control may pass to block 446 to handle the response as necessary, and sequence 440 may be complete. Otherwise, control may pass to block 448 to initiate a second query to the same generative model or to a different generative model (which may be remote to the first generative model and/or the autonomous vehicle), but instead using vector environmental event data. Control may then pass to block 446 to handle the response as necessary, and sequence 440 is complete.

Figure 10:
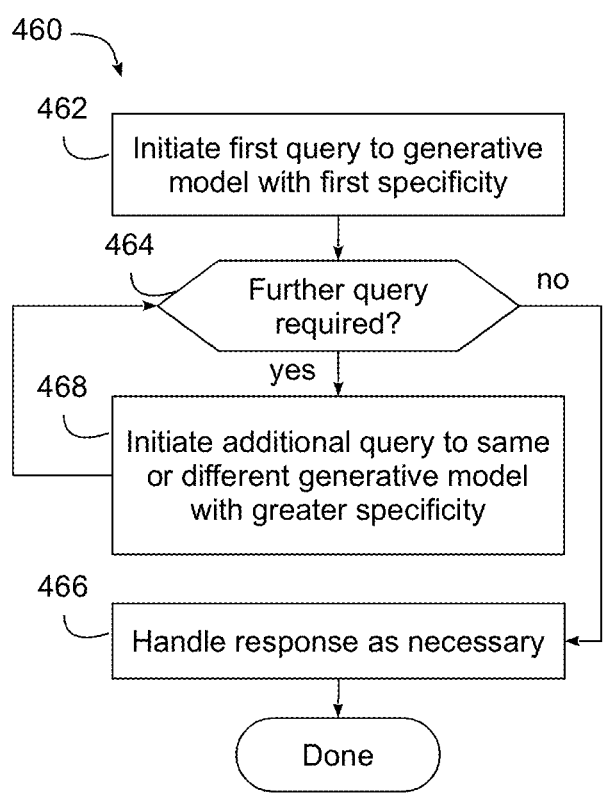
FIG. 10 is a flowchart illustrating another example operational sequence for initiating multiple queries to one or more generative models in connection with detecting events consistent with some implementations.

FIG. 10 illustrates yet another operational sequence 460 that incorporates multiple steps in connection with event detection, and in particular, the use of multiple queries having increasing specificity, and in some instances, based upon a dialog with a generative model, e.g., using natural language queries. In particular, it will be appreciated that a number of generative models, and in particular generalized foundation models, may be queried using a natural language interface, and it may be suitable in some implementations to utilize such an interface in connection with event detection.

Thus, in operational sequence 460, a first query having a first specificity is initiated to a generative model in block 462. Then, based on the results of the query, block 464 may determine whether a further query is required, and if not, control may pass to block 466 to handle the response as necessary, and sequence 460 may be complete. Otherwise, control may pass to block 468 to initiate an additional query to the same generative model or to a different generative model (which may be remote to the first generative model and/or the autonomous vehicle), but with greater specificity. Control may then return to block 464 to determine if a further query is required, until such time as no further queries are required. At that point, control passes to block 466 to handle the response as necessary, and sequence 460 is complete.

Figure 11:
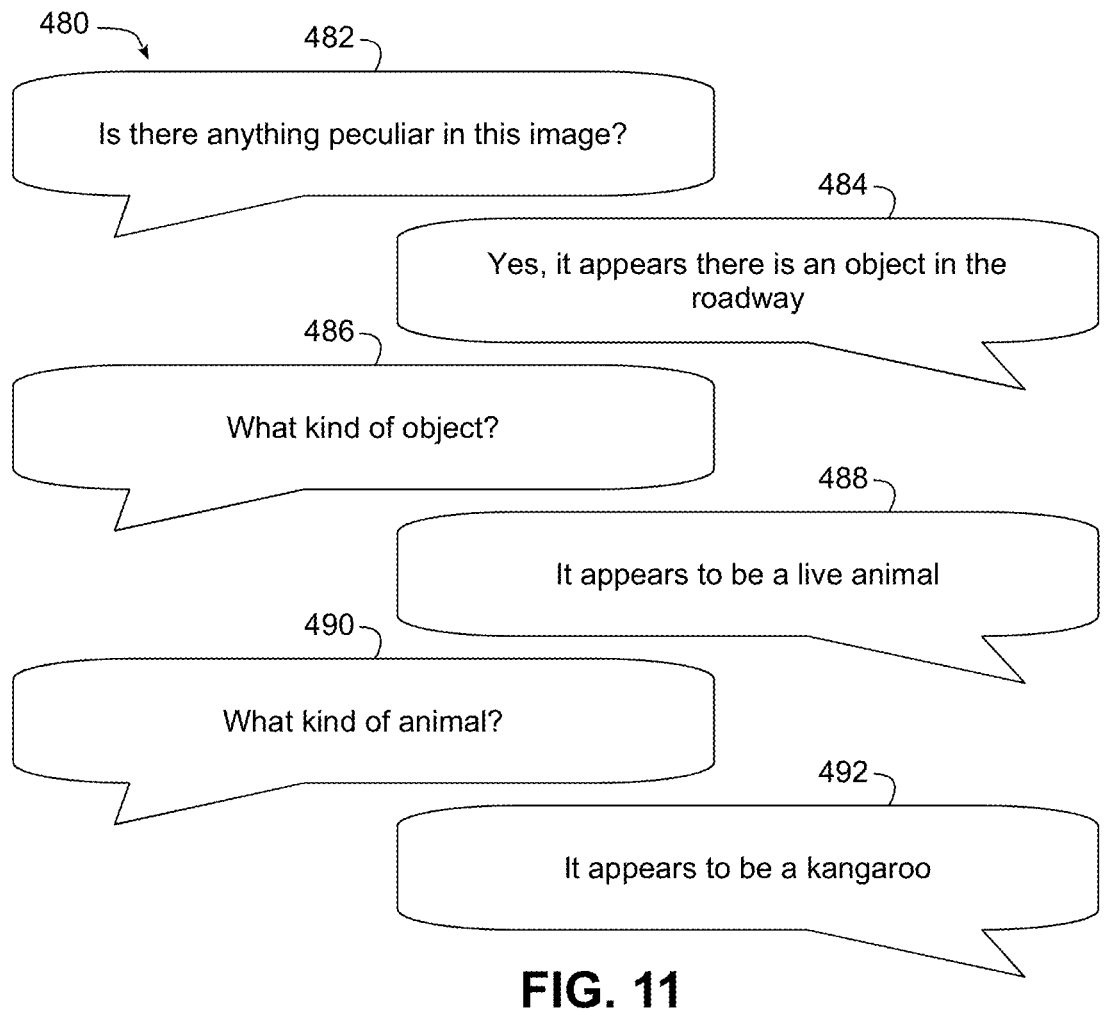
FIG. 11 illustrates an example interaction with a generative model using a sequence of queries consistent with some implementations.

While a wide variety of queries may be utilized in different implementations, FIG. 11 illustrates one example dialog 480 of queries and responses between an event detection system and a generative model, in particular a generalized foundation model, and utilizing queries having increasing levels of specificity. Assume, for example, that the image presented to the generative model is of the environment depicted in FIG. 1, where a kangaroo 188 is disposed in the road 101 proximate to an autonomous vehicle 100. It will be appreciated, for example, that for an autonomous vehicle designed to operate initially in the United States, kangaroos would ordinarily not be expected to ever be present on or near any road, and as such, adapting an autonomous vehicle control system to recognize kangaroos would be expected to be of relatively low priority, so in the event that a kangaroo ever escaped from a local zoo and entered a roadway where it was visible to an autonomous vehicle, such an event could reasonably be considered to be an anomalous event as well as an event for which the autonomous vehicle would not be expected to be capable of handling. As such, identification of such an event may be handled in some implementations using a sequence of increasingly specific queries to a generative model.

In some implementations, for example, it may be desirable to simply query a generative model with one or more images or other perception data, and a broad text query 482 such as "is there anything peculiar in this image?" For the purposes of the present disclosure, such a query is also referred to herein as an anomaly query, as the query is not directed to any particular type of event or circumstance, but is rather directed to identifying an event or circumstance that is not specifically enumerated in the query. Other manners of formulating such a query may be used, e.g., "is there anything weird in this image?", "do you see anything out of the ordinary in this image?", etc. The generative model may generate a response 484 such as "yes, it appears there is an object in the roadway," and an appropriate follow-up query 486 may more specifically ask "what kind of object?" A second response 488 to the second query may be "it appears to be a live animal," which may generate a third, even more specific query 490 such as "what kind of animal?" As identification of a kangaroo in an image is well within the capabilities of a generalized foundation model, a response 492 such as "it appears to be a kangaroo" may be generated in response to the third query, thereby enabling the event to be identified and appropriately handled (e.g., by initiating a teleassist session, notifying a fleet or third-party service, etc.) It will be appreciated that such an iterative querying approach may be automated in some implementations, with an autonomous vehicle control system dynamically generating follow-up queries based on earlier responses. By doing so, such an approach provides a significant technical advantage insofar as it effectively implements an interactive dialog or conversation that is executed in a near real-time manner and with a latency relative to first detection that allows for the handling of the event to be initiated in a timely manner that is compatible with the dynamic environment within which the autonomous vehicle is operating.

Figure 12:
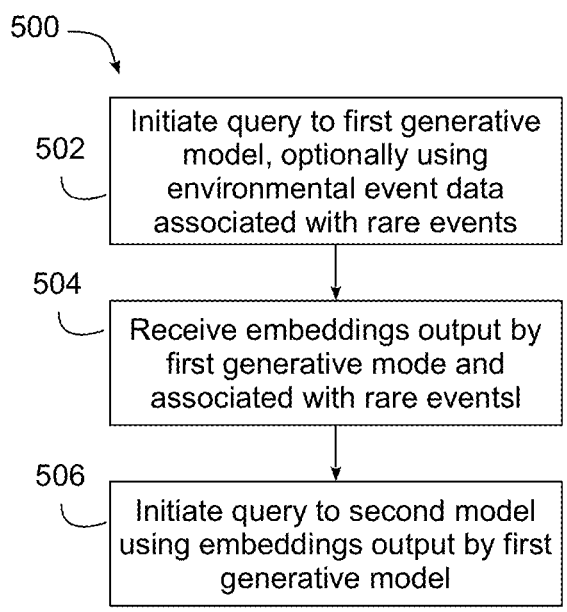
FIG. 12 is a flowchart illustrating an example operational sequence for initiating a query to a system including a generalized foundation model coupled to an application-specific model consistent with some implementations.

Now turning to FIG. 12, as discussed above in connection with FIG. 4, it may be desirable in some implementations to utilize a hybrid architecture whereby a generalized foundation model is coupled with a downstream event detection model that is trained to detect events based on embeddings output by the generalized foundation model. FIG. 12 illustrates an operational sequence 500 capable of utilizing such a hybrid architecture, and begins in block 502 by initiating a query to a first generative model, e.g., a generalized foundation model, using perception data captured by one or more perception sensors of the perception system of an autonomous vehicle, and in some instances, using environmental event data associated with various rare events as well. In response to the query, the generative model generates, in block 504, various embeddings associated with any detected rare events, and then in block 506, these embeddings are used to query a second model, e.g., an event detection model, to identify an event perceived by the perception system of the autonomous vehicle. The event detection model, as discussed above in connection with FIG. 4, may be trained using embeddings identifying various rare events and generated by the first generative model, and as such, the output of the more generalized first generative model may effectively be refined by the second model and adapted more specifically for an autonomous vehicle application.

As will become more apparent below, the various techniques described above may be utilized in a number of different end use cases, and may be combined with one another in various manners. Therefore, while a number of different techniques for utilizing generative models in connection with event detection have been described above, the technical solutions described herein are not limited to the specific implementations described above.

Use of Generative Model Queries for Teleassist

The aforementioned technical approaches have principally been discussed in connection with an end use case associated with distributing identified and/or anomalous events as well as other forms of road intelligence to various remote services such as fleet services and third-party services. However, it will be appreciated that the aforementioned approaches may be utilized in a wide variety of other end use cases associated with the operation of autonomous vehicles.

One such end use case involves the provision of teleassist services to an autonomous vehicle. Teleassist systems generally incorporate "human-in-the-loop" technology to enable a human operator, who may be remote from the vehicle, to make decisions and assist in guiding a vehicle whenever uncommon conditions that present challenges to autonomous operation are encountered by an autonomous vehicle.

Teleassist systems can require substantial human resources to support a fleet of autonomous vehicles, and the level of resources required will generally depend on the number of autonomous vehicles in the fleet and the frequency with which interactions between teleassist operators and autonomous vehicles, referred to herein as teleassist sessions, generally occur. Reducing the frequency of teleassist sessions, while still ensuring that every condition that actually requires teleassist operator intervention is addressed in a timely manner, therefore maximizes the efficiency and effectiveness of a teleassist system.

The event detection functionality disclosed herein, for example, may be utilized in some implementations in connection with a teleassist system to trigger teleassist sessions in appropriate circumstances. In addition, such event detection functionality may be utilized in some implementations to filter or discard unnecessary teleassist sessions to free up resources in a teleassist system to handle other, more pressing situations.

Figure 13:
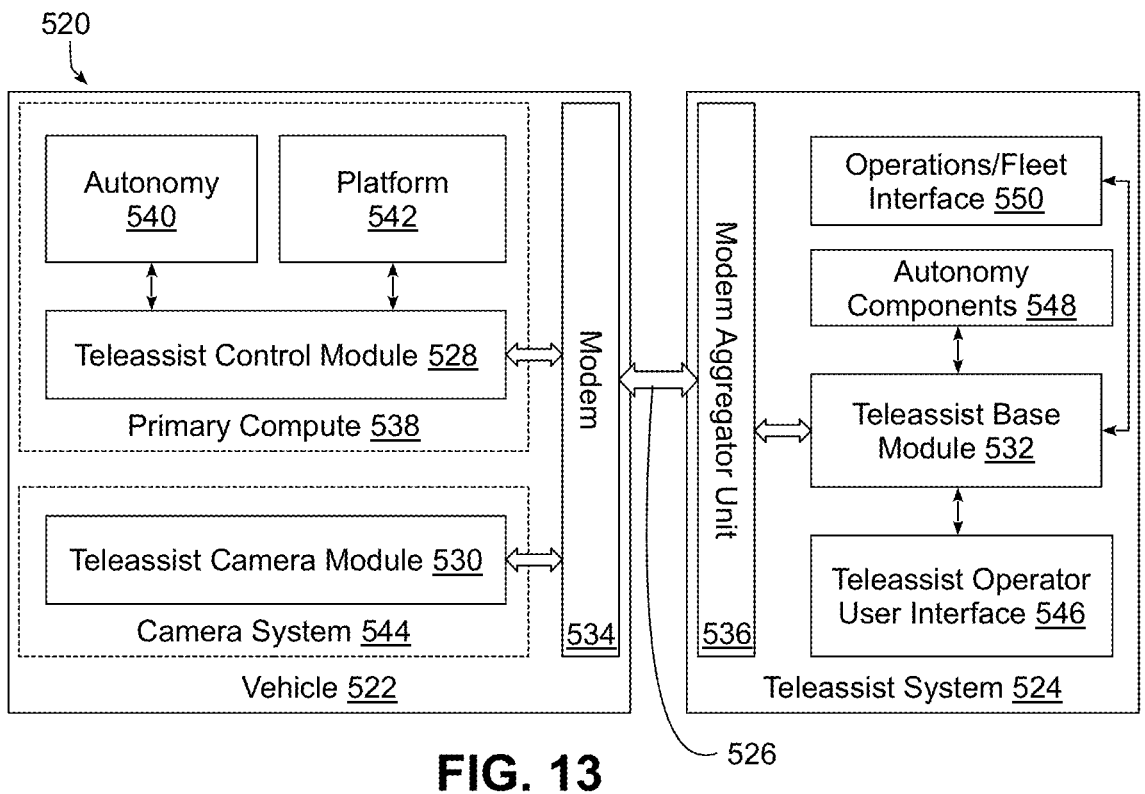
FIG. 13 is a block diagram illustrating an example tele-assist-enabled system consistent with some implementations.

FIG. 13 illustrates one example implementation of a teleassist-enabled system or service 520 whereby an autonomous vehicle 522 interfaces with a remote teleassist system 524 over a network 526. Remote teleassist system 524 may be physically remote from autonomous vehicle 522, and will generally support interfacing with multiple vehicles to enable multiple teleassist operators to concurrently interact with multiple vehicles. In some implementations, teleassist operators may actively and continuously monitor individual vehicles, while in other implementations, individual teleassist operators may interact with multiple vehicles at different times, e.g., so that a particular operator may support multiple vehicles at one time. In some implementations, for example, teleassist operators may be selectively coupled to particular autonomous vehicles on an on-demand basis, e.g., in response to requests generated by the vehicles whenever certain conditions (e.g., various uncommon situations that may benefit from teleassist support) arise. In some implementations, a pool of operators may support a pool of autonomous vehicles, and a teleassist system may initiate teleassist sessions on an on-demand basis, e.g., based upon requests initiated by autonomous vehicles, the teleassist system, or both.

Teleassist support may be implemented in some implementations using a teleassist control module 528 and a teleassist camera module 530 in autonomous vehicle 522 in communication with a teleassist base module 532 in teleassist system 524. Modules 528 and 530 of vehicle 522 may be coupled to network 526 through a modem 534, while module 532 of teleassist system 524 may be coupled to network 526 through a modem aggregator unit 536 capable of communicating with multiple modems 534 of multiple autonomous vehicles 522. Network 526 may be implemented in part using a wireless network such as a 4G, LTE or 5G network, a satellite network, or some combination thereof.

Teleassist control module 528 may be resident in some implementations within a primary compute system 538 of vehicle 522, and may interface with each of an autonomy system 540 and platform 542 of the vehicle to collect and stream data from the primary compute system to teleassist system 524 as well as receive and process operator inputs received from teleassist system 524. In some implementations, primary compute system 538 may be implemented in a similar manner to primary vehicle control system 120 illustrated in FIG. 1, with autonomy system 540 representing high level autonomous control subsystems such as localization, planning, perception, etc., and with platform 542 representing lower level vehicle controls such as provided by control subsystem 158. However, it will be appreciated that teleassist control module 528 may interface with any autonomy or control-related aspect of vehicle 522 in other implementations.

Teleassist camera module 530 may be resident in some implementations within a camera system 544 that manages the on-board cameras on vehicle 522, and module 530 may, in some implementations, stream camera feed data collected from the on-board cameras to teleassist system 524 for viewing by an operator during a teleassist session.

While modules 528 and 530 are implemented separately in FIG. 13, in other implementations, the functionality allocated to each module may vary, or the functionality may be combined into a single module or split into more than two modules. Teleassist base module 532 communicates with modules 528 and 530 during a teleassist session with vehicle 522, and may further manage multiple sessions for multiple vehicles and with multiple operators. Module 532 may also manage scheduling, initiation, and termination of sessions in some implementations.

A teleassist operator user interface 546 is coupled to module 532 to provide a user interface through which an operator, e.g., a human operator, may communicate with a vehicle 522 during a session. The user interface may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation discussed in greater detail below, for example, interface 546 may be a web-based interface that interacts with an operator via a touchscreen display.

Teleassist system 524 may also include one or more autonomy components 548 interfaced with module 532. Autonomy components 548 may include various components that replicate the functionality of similar components in vehicle 522 and/or that are also accessible to a vehicle for use in connection with the primary control of the vehicle. For example, in some implementations, module 532 may have access to the same map data utilized by each vehicle, e.g., as provided by an atlas system as described above, as well as to similar layout functionality as is used by each vehicle to lay out map data in the immediate vicinity of a vehicle. By doing so, module 532 may effectively reconstruct a digital map of at least the fixed objects in the vicinity around a vehicle without having to receive the entire digital map from the vehicle itself, thereby reducing the volume of data streamed by the vehicle for the purpose of reconstructing the environment around the vehicle. In some implementations, the vehicle may provide a current pose of the vehicle as well as data regarding any dynamic entities detected by the perception system (e.g., other vehicles, pedestrians, or other actors or objects detected in the environment but not represented in the map data), and from this more limited amount of data, a graphical depiction of the immediate vicinity around a vehicle may be generated for display to a teleassist operator. In some implementations, autonomy components may also replicate functionality implemented in vehicle 522 to enable local assessment of how a vehicle may respond to certain directives from the teleassist system, and in some implementations, autonomy components may have similar functionality to that implemented in vehicle 522, but with greater capabilities and/or access to greater computing resources than may be available in the vehicle.

Moreover, in some implementations, a teleassist system may be autonomous in nature as well, whereby the teleassist system is effectively the teleassist operator with which an autonomous vehicle interacts during a teleassist session. In such instances, the teleassist system may assess the current context of an autonomous vehicle and send commands, requests, directives, suggestions, etc. for addressing any conditions that triggered a teleassist session. In some implementations, for example, a teleassist system may have access to more compute power than can practically be provided onboard an autonomous vehicle, and thus the teleassist system may be capable of performing computationally complex evaluations to assist an autonomous vehicle and/or may be capable of responding much more quickly.

Teleassist system 524 may also include an operations/fleet interface 550 to facilitate communication with other services that support autonomous vehicles. For example, it may be desirable in some implementations to provide an ability to request roadside assistance or recovery of an autonomous vehicle, or to provide log data for use in diagnosing vehicle issues. The teleassist system may also propagate data collected during a teleoperation session (e.g., data related to lane closures, detected construction or incidents, etc.) to other vehicles in a fleet. Moreover, data received and/or generated by the teleassist system may be used as training data for further training various components of an autonomous vehicle, e.g., to improve the performance of a detector and reduce the occurrence of false positives, or to improve scenario selection and other decisions made by the autonomous vehicle in response to certain sensor input. Other external services may also interface with a teleassist system in other implementations, as will be apparent to those of ordinary skill having the benefit of the instant disclosure.

Figure 14:
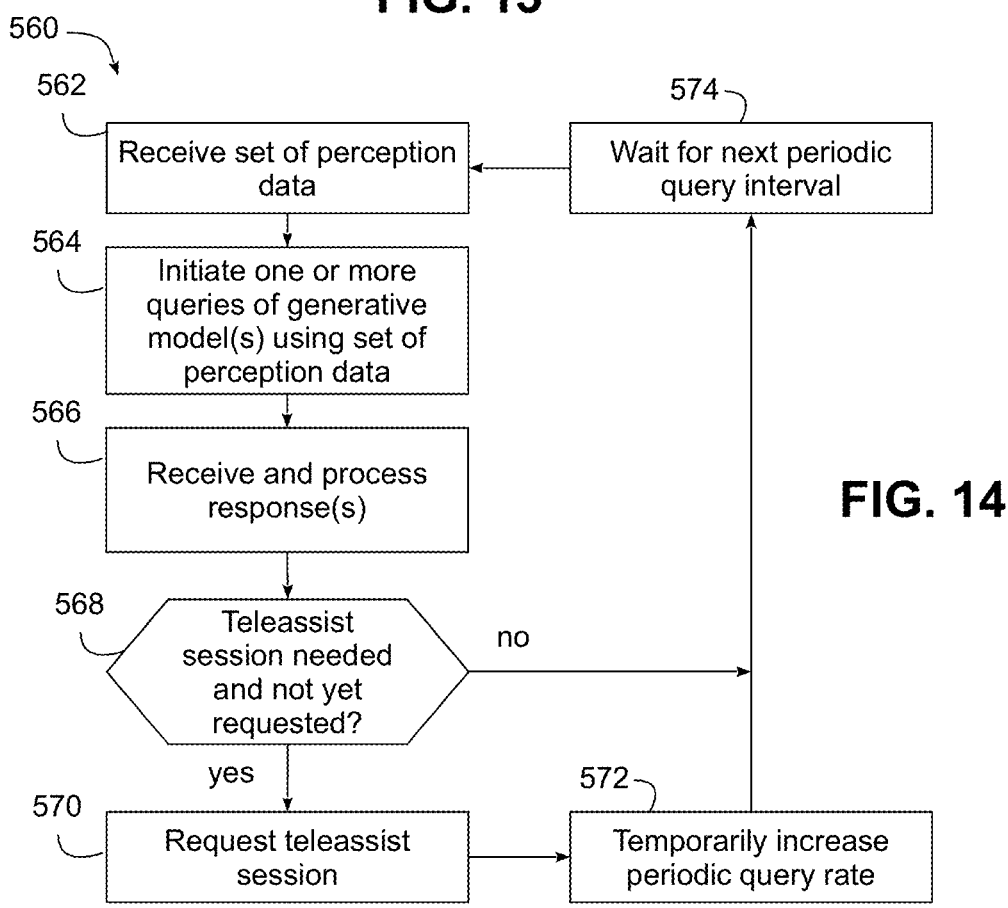
FIG. 14 is a flowchart illustrating an example operational sequence for initiating a teleassist session consistent with some implementations.

FIG. 14 illustrates an example operational sequence 560 for initiating a teleassist session in teleassist system 520 of FIG. 13 consistent with some implementations, and based in part on the detection of an event using a generative model. Sequence 560, in particular, may be implemented within an autonomous vehicle control system and/or in a remote service, and may begin in block 562 by receiving a set of perception data captured by one or more perception sensors of the autonomous vehicle during operation of the autonomous vehicle in its environment. Then, in block 564, the perception data may be used to initiate one or more queries to one or more generative models (e.g., using any of the technical approaches discussed above in connection with FIGS. 2-12), and response data may be received from the generative model(s) and processed, e.g., to identify an event occurring in the environment during operation of the autonomous vehicle. Block 566 may also determine whether the event necessitates initiation of a teleassist session, and then in block 568, a determination may be made as to whether a teleassist session is needed and has not yet been requested.

If so, control may pass to block 570 to automatically initiate a teleassist session between the autonomous vehicle and a remote teleassist system, e.g., by requesting a teleassist session and adding the autonomous vehicle to a queue such that a remote teleassist operator can connect to the autonomous vehicle when available.

A teleassist session may be initiated in response to a number of conditions. For example, identification of a particular event may be used to trigger a teleassist session in some implementations. In addition, in some implementations, the failure to identify an event, or the identification of an event as an anomalous event, may be used to trigger a teleassist session. The query to the generative model in some implementations, for example, may query for the presence of an anomalous event, e.g., by querying the model as to whether there is anything peculiar detected in the perception data, similar to as discussed above in connection with FIG. 11. In addition, a query in some implementations may utilize environmental event data as described above, and in some implementations may utilize embeddings generated from the perception data.

In addition, in some implementations, and as illustrated in block 572, it may also be desirable to temporarily increase a periodic query rate at which the generative model is queried, while the autonomous vehicle is queued for a teleassist session, after the teleassist session has been initiated, or during both time periods. The temporary increase, for example, may be initiated by an autonomous vehicle control system in connection with requesting a teleassist session, or may be initiated by the teleassist system, e.g., by directing the autonomous vehicle to increase the periodic query rate in response to queuing the autonomous vehicle for an upcoming teleassist session, or in some instances, in response to a determination that the autonomous vehicle will be queued for at least a predetermined duration. By doing so, greater computational resources are devoted to event detection prior and/or during a teleassist session, given that the autonomous vehicle is in an operational state where a teleassist session has been determined to be desirable. Control then passes to block 574 to wait for the next periodic query interval, and then back to block 562 to initiate another periodic query interval. In addition, returning to block 568, if it is determined that a teleassist session is not needed, or alternatively, that a teleassist session has already been requested, blocks 570 and 572 are bypassed, and control passes directly to block 574 to wait for the next periodic query interval.

Figure 15:
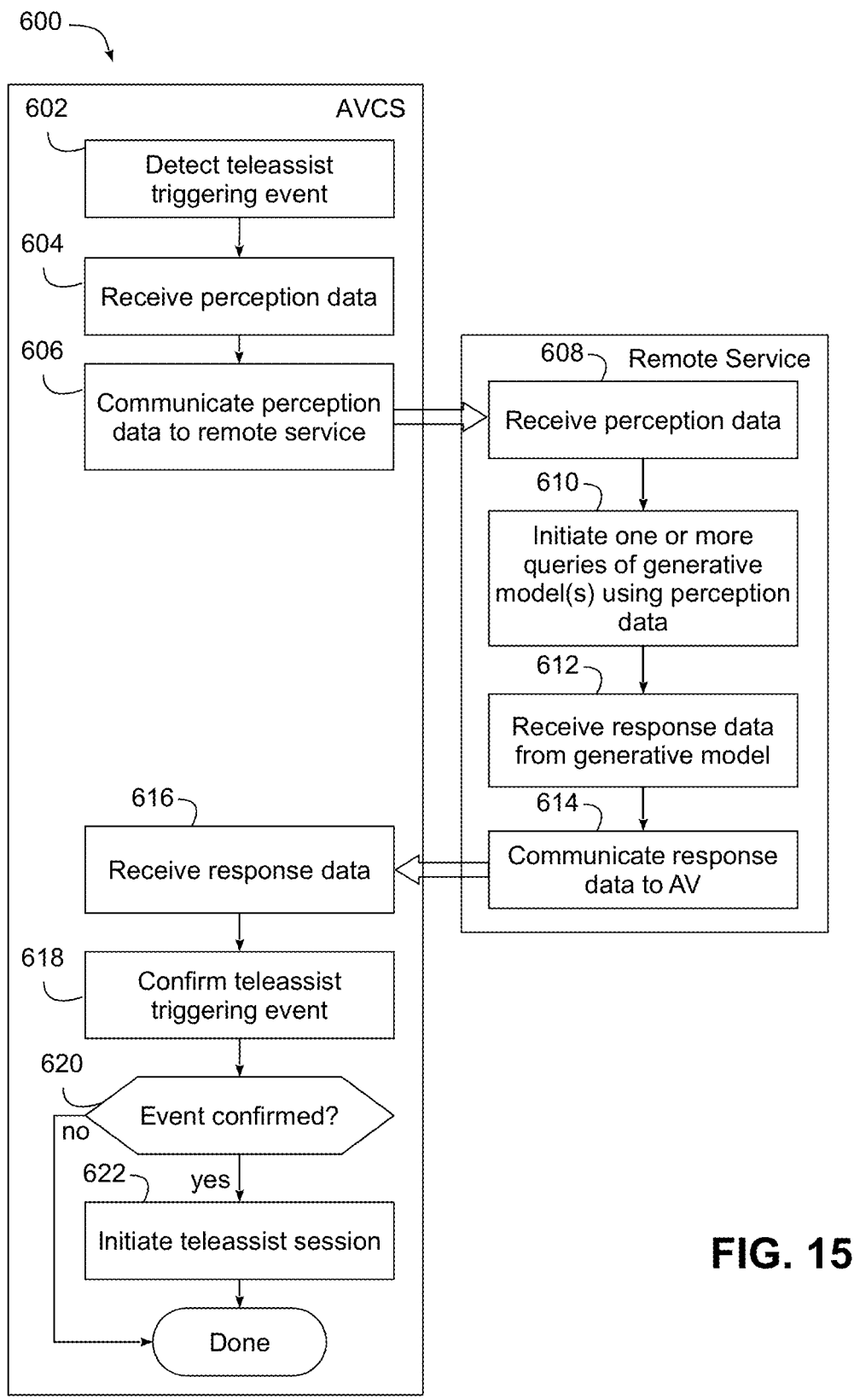
FIG. 15 is a flowchart illustrating an example operational sequence for filtering a teleassist session consistent with some implementations.

Now turning to FIG. 15, while the output of a generative model may be used in some implementations to initiate a teleassist session, in some implementations, the output of a generative model may be used to filter or discard a potential teleassist session and thereby avert the need to utilize teleassist resources in a situation where a teleassist session is actually not required. FIG. 15, in particular, illustrates an operational sequence 600 for filtering a teleassist session consistent with some implementations, and utilizing a remote service and a generative model resident therein to do so. As illustrated in FIG. 15, sequence 600 begins in block 602 with the autonomous vehicle control system detecting a teleassist triggering event, i.e., an event that suggests the need for a teleassist session. One such type of event, which will be discussed in greater detail below, is the detection, in perception data captured by the perception sensors of the autonomous vehicle, of an unmapped sign, i.e., a sign that is detected by the perception sensors of an autonomous vehicle that is not also indicated in the map data utilized by the autonomous vehicle.

When unmapped signs are detected in an environment, interpretation of the signs by a teleassist operator may be desirable in some implementations to ensure that autonomous vehicles operate in a manner consistent with the current mandates established for the roadway by the road signs along the roadway. As one specific example, where temporary construction has been initiated in an area, temporary speed limit signs may be posted specifying a reduced speed, such that adherence only to a mapped speed limit may result in an autonomous vehicle violating a newly posted speed limit. However, a relatively large number of unmapped road signs are in fact not relevant to the operation of an autonomous vehicle (e.g., due to mis-identification of billboards or other non-road sign related text in the environment as a potential road sign, or due to detection of road signs that have been overridden by other posted road signs in the immediate vicinity). Initiation of a teleassist session to review a mis-identified sign therefore can needlessly occupy a teleassist operator, so avoiding such unnecessary sessions is generally desirable.

The technical solutions described herein are not limited to such events, however, and other types of teleassist triggering events may be envisioned in other implementations, e.g., the detection of various road conditions, construction conditions, hazardous conditions, or other conditions that potentially may be confirmed or rejected by an analysis of perception data by a generative model.

Next, in block 604, perception data, including, in some instances, the perception data associated with the teleassist triggering event, is received, and in block 606, the perception data (or alternatively embeddings generated therefrom) is communicated to a remote service, which receives the perception data in block 608. The received perception data is then used in block 610 to initiate one or more queries to one or more generative models (e.g., in some instances, a generalized foundation model) to attempt to confirm the teleassist triggering event (e.g., using any of the technical approaches discussed above in connection with FIGS. 2-12). Response data from the generative model is received in block 612, and at least a portion of this data is communicated back to the autonomous vehicle by the remote service in block 614.

The communicated response data is received by the autonomous vehicle control system in block 616, and block 618 then attempts to confirm the teleassist triggering event based on the response data. Block 620 determines if the event has been confirmed, and if so, passes control to block 622 to proceed with initiating the teleassist session. Otherwise, block 620 bypasses block 622, and discards or rejects the teleassist triggering event to at least partially filter out the teleassist session. By doing so, the autonomous vehicle reverts to a standard operational mode, and continues to operate in an autonomous manner, without the need for teleassist intervention.

Figure 16:
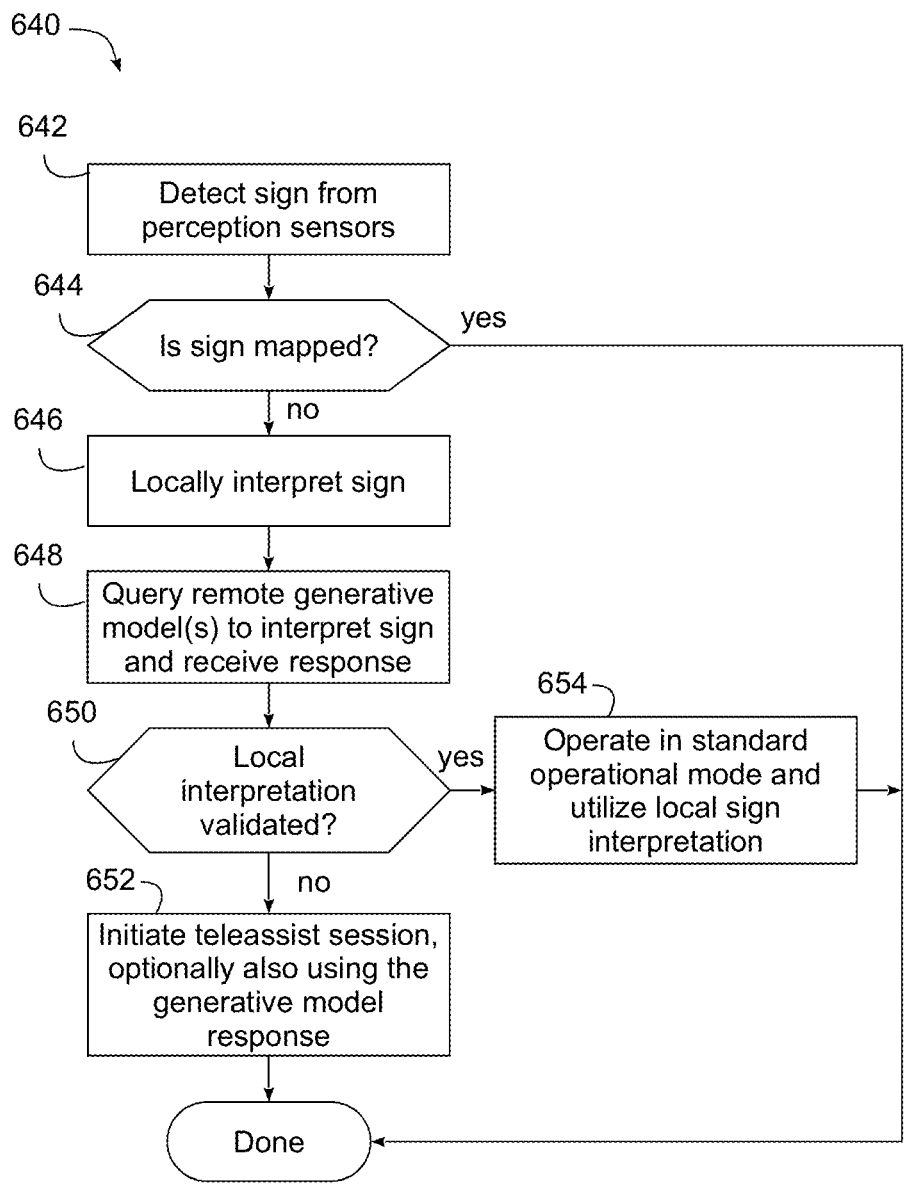
FIG. 16 is a flowchart illustrating an example operational sequence for filtering a teleassist session for an unmapped sign consistent with some implementations.

As noted above, a wide variety of teleassist trigger events can be confirmed or rejected in various implementations. FIG. 16, for example, illustrates an operational sequence 640 configured to handle a specific type of teleassist trigger event associated with an unmapped sign, and capable of implemented in sequence 600 of FIG. 15. A perception system of an autonomous vehicle control system, for example, may be configured in some implementations to detect and interpret signs present in the fields of view of the perception sensors of an autonomous vehicle, e.g., using one or more output heads of a multi-head perception model such as model 310 of FIG. 5, which is trained to detect and interpret road signs. Sequence 640 may therefore begin in block 642 by detecting a sign using the perception sensors, and then determining in block 644, whether the detected sign is mapped, e.g., by accessing map or atlas data for the surrounding environment and attempting to match the detected sign with a sign that is located in the same or a similar location in the environment. If the sign is determined to correspond to a mapped sign, sequence 640 is complete.

If, however, the sign is determined to be unmapped, a first, local interpretation of the road sign may be made in block 646, e.g., using a perception model or head trained to interpret road signs. Next, in block 648, a remote generative model, e.g., a generalized foundation model in some implementations, is queried using at least a portion of the perception data, and a response is received therefrom providing a second, remote interpretation of the road sign (e.g., using any of the technical approaches discussed above in connection with FIGS. 2-12). Block 650 then determines, e.g., based on a comparison performed between the first and second interpretations, whether the second interpretation validates the first interpretation.

If not, which indicates that the local interpretation by the autonomous vehicle requires confirmation by a teleassist operator, block 640 passes control to block 652 to initiate a teleassist session. In addition, in some implementations a response of the generative model, e.g., the second interpretation of the road sign, may be provided to a teleassist operator during the teleassist session to assist the teleassist operator with interpretation of the road sign.

If, however, the local interpretation by the autonomous vehicle is validated by the generative model, block 650 may instead pass control to block 654 to operate the autonomous vehicle in the standard operation mode, and utilizing the local interpretation as if the road sign was a mapped sign. In some implementations, for example, text displayed on a sign as determined via remote generative model interpretation of the sign may be compared to text determined from local interpretation of the sign. In some implementations, additional factors associated with the sign's appearance (e.g., icons depicted on the sign, the overall shape of the sign, the color of the sign, the size of the sign, etc.) and/or additional factors associated with the overall context of the sign (e.g., the height of the sign, the placement of the sign relative to the roadway, the presence of other signs in the same vicinity, etc.) may also be interpreted locally and via a remote generative model, and used to validate a local interpretation of a sign.

In some implementations, on the other hand, validation of a local interpretation of an unmapped sign may still result in initiation of a teleassist session, e.g., by the autonomous vehicle control system. For example, where an unmapped sign is confirmed to be associated with a new and as-yet unmapped construction area, the autonomous vehicle control system may still initiate a teleassist session even if the sign interpretation is validated to ensure the autonomous vehicle is being overseen while traversing through the construction area.

Figure 17:
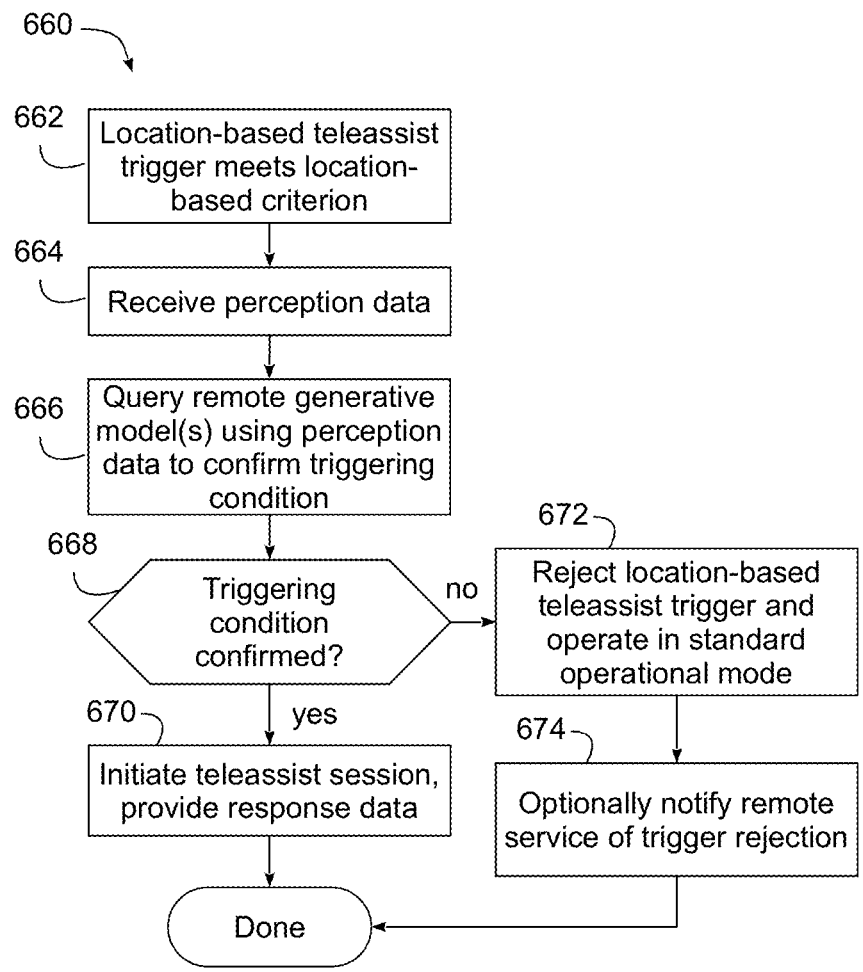
FIG. 17 is a flowchart illustrating an example operational sequence for filtering a teleassist session for a location-based teleassist trigger consistent with some implementations.

FIG. 17 next illustrates an example operational sequence 660 for filtering a teleassist session for a location-based teleassist trigger consistent with some implementations. In particular, in some implementations location-based teleassist triggers may be established for an autonomous vehicle to automatically initiate a teleassist session whenever the location of an autonomous vehicle meets a predetermined location-based criterion, e.g., within a predetermined distance from a particular location and/or within a predetermined geofence defined in an environment. The location-based teleassist triggers may be stored locally in an autonomous vehicle in some implementations and periodically polled to determine whether the criteria of any of the stored triggers have been met.

Location-based teleassist triggers may be used, for example, to pre-emptively initiate teleassist sessions in areas where it is expected that teleassist will be needed or desired, e.g., in construction areas; areas with road closures; areas where crashes, law enforcement, emergency vehicles, traffic, adverse weather and/or road conditions exist; etc. It will be appreciated, however, that if the condition that initiated the generation of a location-based teleassist trigger ceases to exist, initiation of a teleassist session in such a circumstance will be superfluous and needlessly occupy a teleassist operator. As such, it may be desirable in some implementations to attempt to confirm a condition associated with a location-based teleassist trigger to ensure that the condition continues to be valid in the environment before initiating a teleassist session.

Sequence 660, for example, may begin in block 662, by determining that a location-based teleassist trigger meets a predetermined location-based criterion set for the trigger. Block 664 then receives perception data from the perception sensors of the autonomous vehicle, and utilizes the perception data to query a remote generative model to attempt to confirm a triggering condition associated with the location-based teleassist trigger (e.g., using any of the technical approaches discussed above in connection with FIGS. 2-12). As noted above, various triggering conditions may be associated with a location-based teleassist trigger, e.g., the presence of construction, a road closure, law enforcement, a crash, traffic, an adverse weather condition, an adverse road condition, etc. Example queries to a generative model may include, for example, queries related to the presence of particular conditions in particular images supplied as perception data, e.g., "is there construction equipment in this picture?", "is there a police car in this picture?", "is it snowing in this picture?", etc., which may be issued depending on the particular triggering condition associated with the location-based teleassist trigger.

Next, in block 668, in response to confirming the triggering condition, i.e., confirming that the triggering condition is valid and still exists in the environment, control passes to block 670 to initiate a teleassist session. In addition, at this time, any response data received from the generative model may also be provided to the teleassist operator during the teleassist session, to the extent it may be useful.

On the other hand, if there was an inability to confirm triggering condition, i.e., a failure to confirm that the triggering condition is valid and still exists in the environment, block 668 passes control to block 672 to automatically reject initiation of the teleassist session between the autonomous vehicle and a remote teleassist system, and even though the location of the autonomous vehicle is determined to meet the location-based criterion of the location-based teleassist trigger. At this time, the autonomous vehicle may revert to operation in a standard operational mode, effectively ignoring the trigger. In addition, as illustrated in block 674, a remote service, e.g., a fleet or third-party service, may be notified of the rejection of the location-based teleassist trigger, such that the service is informed that the condition that initially triggered the creation of the location-based teleassist trigger may no longer exist.

Use of Generative Model Queries for Vehicle Logging

Another end use case in which the various technical approaches may be applied is in connection with vehicle logging. It will be appreciated, in particular, that while vehicle logging is an important part of training and adapting autonomous vehicles to operate in an autonomous manner in an environment, the volume of vehicle log data that is and will be collected in the future is immense, and moreover, that much of the data in a vehicle log may ultimately not be particularly useful in refining the operation of autonomous vehicles, particularly where the log data is associated with the operation of an autonomous vehicle in an area and in a manner for which the autonomous vehicle has been thoroughly trained. As a result, significant resources may be expended in the future collecting, transmitting, and storing vast amounts of log data that may never be utilized for training or other relevant purposes. Furthermore, as the autonomous vehicles operating in an environment increase in number, distribution, and utilization, the volume of vehicle log data that may be generated will likely continue to grow exponentially.

In some implementations, however, it may be desirable to utilize queries to one or more generative models to facilitate marking of portions of a vehicle log associated with noteworthy or otherwise interesting events detected by the generative model(s). Doing so in some implementations, for example, may allow unmarked portions of a vehicle log to be effectively filtered out and discarded, potentially substantially reducing the volume of vehicle log data needing to be collected, transmitted, and/or stored by a first party. Further, in many instances this may be performed in a proactive manner (e.g., without specific queries as to particular types of events), as well as prior to even offloading of the vehicle log from the autonomous vehicle.

Figure 18:
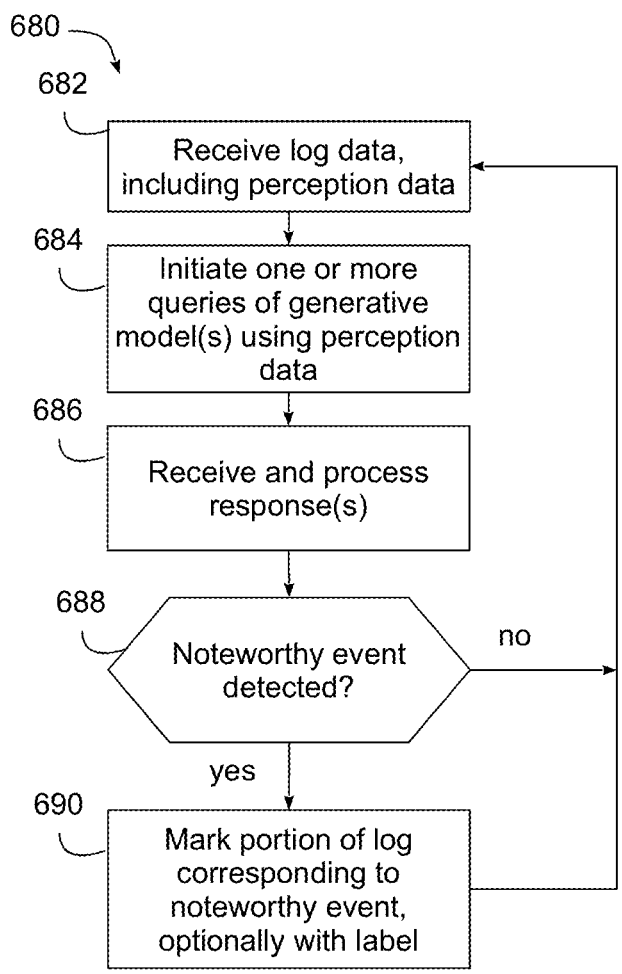
FIG. 18 is a flowchart illustrating an example operational sequence for marking a vehicle log consistent with some implementations.

FIG. 18, for example, illustrates an example operational sequence 680 for marking a vehicle log consistent with some implementations. In some implementations, sequence 680 may be performed in real time, and during the normal operation of an autonomous vehicle while vehicle log data is being collected. Alternatively, in some implementations sequence 680 may be performed on perception data that has already been captured and stored in a vehicle log, whether on-board an autonomous vehicle prior to offloading of the vehicle log, on a device that is used to store and/or communicate vehicle log data to a remote service, or within a remote service after transmission of the vehicle log thereto.

Sequence 680 begins in block 682 by receiving log data, which may additionally include perception data. As noted above, the perception data may be collected and analyzed in real time as it is collected, or alternatively, the perception data may be collected in real time and later analyzed. In either event, the perception data may be considered to be log data within the context of the disclosure regardless of whether it has or has not yet been stored in a log. The perception data from the log data is then used to initiate one or more queries to one or more generative models in block 684, e.g., using any of the technical approaches described above in connection with FIGS. 2-12, to attempt to identify noteworthy events in the log data. A noteworthy event, in this regard, may be considered to be an event that may be interesting for the purposes of training an autonomous vehicle, or specifically of a model utilized thereby.

In some implementations, for example, generative model queries may be configured to identify specific events related to particular models or model output heads, e.g., using environmental event data as described above, whereby the generative model(s) may be used to identify specific noteworthy events in the log from a set of predetermined events identified in the environmental event data. Thus, for example, where a particular model or model output head is configured to detect emergency vehicles, noteworthy events associated with the presence of emergency vehicles may be identified based on queries to a generative model associated with emergency vehicles, flashing lights, sirens, vehicles disregarding traffic signals, vehicles traveling at a high rate of speed, or other potential indicators as to the presence of an emergency vehicle. Alternatively, generative model queries may be used to identify anomalous events that are not identified from among a set of predetermined events, or general queries such as "is there anything peculiar?" may be made to identify potentially noteworthy events that are otherwise not enumerated in any environmental event data.

Next, in block 686, one or more responses are received to the query and are processed, e.g., to identify any potentially noteworthy events in the log data. Block 688 then determines if any noteworthy event is detected, and if so, passes control to block 690 to mark the portion of the log corresponding to the noteworthy event, and to optionally apply a label to the portion of the log, e.g., using response data such as text tokens, vector embeddings, etc. output by a generative model and otherwise providing descriptive information about what is visible in the perception data. Control then returns to block 682 to process a next set of log/perception data. Returning to block 688, if no noteworthy event is detected, block 690 is bypassed, effectively leaving the portion of the log processed in blocks 682-686 unmarked.

Figure 19:
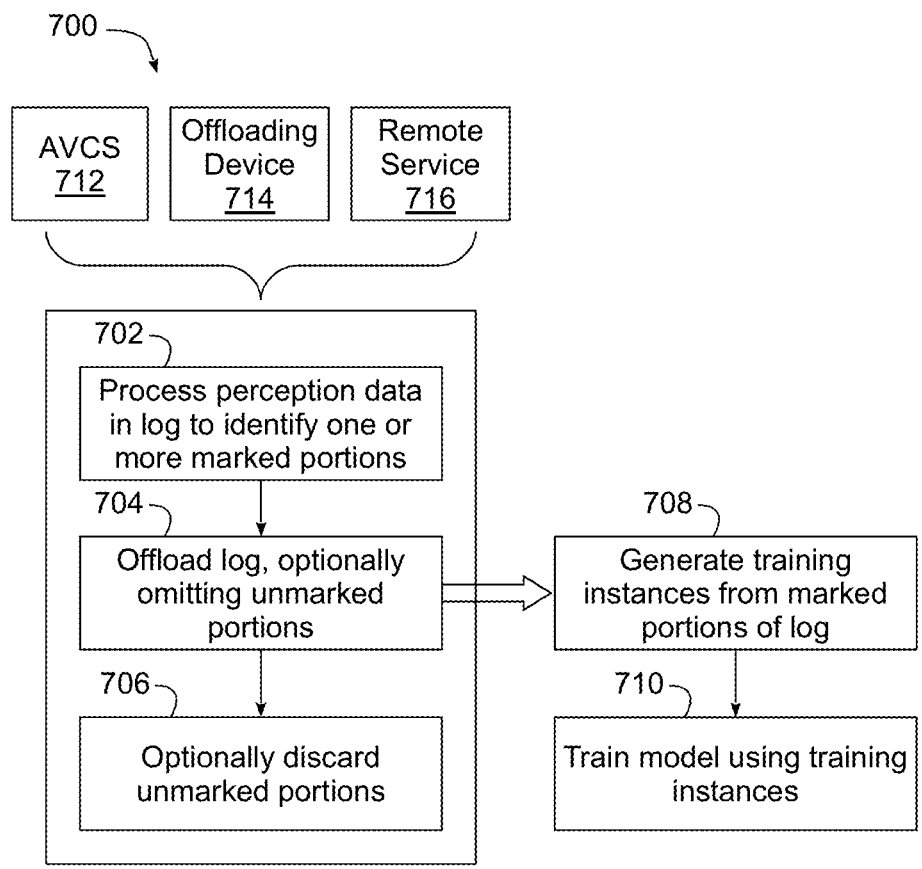
FIG. 19 is a flowchart illustrating an example operational sequence for offloading a vehicle log consistent with some implementations.

Upon marking of or otherwise identifying portions of a log containing noteworthy events, the log may be processed in a number of manners, as illustrated by operational sequence 700 of FIG. 19. In particular, upon processing of perception data in a vehicle log to identify one or more marked portions (e.g., in the manner illustrated by sequence 680 of FIG. 18), the log may be offloaded from the autonomous vehicle in block 704, and optionally omitting any unmarked portions from the offloaded data. In addition, in some implementations, and as illustrated in block 706, unmarked portions of the log may be discarded, potentially without ever having been offloaded from the autonomous vehicle, thereby substantially reducing the amount of log data that must be transmitted to an external device, as well as reducing the amount of storage required to store the offloaded log data. In addition, as illustrated by block 708, the offloaded log data, and in particular the marked portions thereof, may be used to generate one or more training instances for use in training one or more models of an autonomous vehicle, which is illustrated in block 710.

Furthermore, as illustrated by blocks 712, 714, and 716, portions of the various operations illustrated in blocks 702, 704 and 706 may be performed onboard of an autonomous vehicle, e.g., in an autonomous vehicle control system 712 thereof, in an offloading device 714 (i.e., an electronic device used to offload log data from an autonomous vehicle), and/or in a remote service 716.

In various implementations, a number of benefits may be obtained. For example, in some implementations, a log may be dynamically filtered as it is being generated or otherwise while it is still resident in an autonomous vehicle to reduce the volume of log data to be offloaded, processed, and stored downstream. In addition, in some implementations, noteworthy events may be marked proactively, and in some instances, without specifically querying for particular types of events. Furthermore, in some implementations, logs may be prioritized for later processing based upon being marked as a result of certain types of events.

Road Intelligence

Yet another end use case in which the various technical approaches may be applied is in connection with distributing road intelligence to a fleet or to other third parties such as governmental entities, shippers, carriers, maintenance providers, etc. Any of the aforementioned types of events, conditions or other information capable of being detected and/or identified by a generative model as described above may be distributed via services such as fleet and third-party services 222, 226 of FIG. 2, e.g., using the notifications described above in connection with FIGS. 2 and 6, as well as using any of the technical approaches discussed above in connection with FIGS. 2-12. Such events, conditions and other information may include, but are not limited to, current weather conditions, road conditions (e.g., potholes), traffic conditions, construction conditions, hazardous conditions (e.g., objects in the roadway), infrastructure conditions, crashes, emergency conditions, etc. For example, similar to operational sequence 340 of FIG. 6, road intelligence may be distributed to various entities by receiving perception data captured by one or more perception sensors of an autonomous vehicle during operation of the autonomous vehicle in an environment, initiating querying of a generative model using the received perception data to identify an event occurring in the environment during operation of the autonomous vehicle, and, in response to identifying the event, automatically propagating the identified event to one or more remote distribution services, e.g., by transmitting or otherwise communicating the identified event to the remote distribution service(s).

In one implementation, for example, a first-party road intelligence system may be utilized to receive event notifications from a fleet of autonomous vehicles, and may be integrated with various remote services of various different types of entities through APIs made available to third parties by those entities. Different categories of identified events may be mapped to different entities, such that, upon receipt of an event notification from an autonomous vehicle, the road intelligence system may select a suitable entity to which the notification should be directed, and then utilize the API for that selected entity to communicate the notification (or alternatively, additional and/or other data explaining the identified event) to the selected entity. For example, an event notification associated with an identified event such as a detected pothole in the road may be directed to the Department of Transportation or other governmental entity responsible for handling road repairs, while an event notification associated with a live animal detected on the roadway may be directed to the highway patrol and/or animal control services to initiate capture of the animal. In other implementations, rather than utilizing a first-party road intelligence system, an autonomous vehicle control system may also be configured to route event notifications to different remote services directly.

Other end use cases will be appreciated by those of ordinary skill having the benefit of the instant disclosure, so the technical solutions described herein are not limited to the particular end use cases described herein.

CONCLUSION

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another.

What is claimed is:

1. A method implemented by one or more processors, the method comprising:
   receiving perception data captured by one or more perception sensors of an autonomous vehicle during operation of the autonomous vehicle in an environment;
   initiating querying of a generative model using the received perception data to identify an event occurring in the environment during operation of the autonomous vehicle;
   in response to identifying the event, automatically initiating a teleassist session between the autonomous vehicle and a remote teleassist system;
   periodically initiating querying of the generative model using the communicated perception data; and
   dynamically adjusting a rate of the periodic queries based on an operational state of the autonomous vehicle.

2. The method of claim 1, wherein initiating querying of the generative model using the received perception data to identify the event includes initiating querying of the generative model using the received perception data to identify an anomalous event occurring in the environment during operation of the autonomous vehicle.

3. The method of claim 1, wherein dynamically adjusting the rate of periodic queries based on the operational state of the autonomous vehicle includes increasing the rate of periodic queries while the autonomous vehicle is queued for the teleassist session between the autonomous vehicle and the remote teleassist system.

4. The method of claim 1, wherein dynamically adjusting the rate of periodic queries based on the operational state of the autonomous vehicle includes increasing the rate of periodic queries after initiation of the teleassist session between the autonomous vehicle and the remote teleassist system.

5. The method of claim 1, wherein dynamically adjusting the rate of periodic queries based on the operational state of the autonomous vehicle includes increasing or decreasing the rate of periodic queries after identification of the event.

6. The method of claim 1, wherein the query initiated to the generative model queries for presence of an anomalous event in the perception data.

7. The method of claim 1, wherein the query initiated to the generative model is an anomaly query that queries whether anything peculiar is detected in the perception data.

8. The method of claim 1, wherein initiating the querying of the generative model is performed by a remote service that is remote to the autonomous vehicle, the method further comprising processing the perception data in an autonomous vehicle control system of the autonomous vehicle to generate embeddings representing the perception data captured by the one or more perception sensors, and periodically communicating the embeddings from the autonomous vehicle to the remote service.

9. The method of claim 1, further comprising:
   periodically communicating perception data from the autonomous vehicle to a remote service to cause the remote service to initiate the querying of the generative model using the communicated perception data; and
   dynamically adjusting a rate of the periodic communications based on an operational state of the autonomous vehicle.

10. The method of claim 9, wherein dynamically adjusting the rate of periodic communications of perception data includes increasing the rate of periodic communications while the autonomous vehicle is queued for the teleassist session.

11. The method of claim 9, wherein dynamically adjusting the rate of periodic communications of perception data includes increasing the rate of periodic communications after initiation of the teleassist session.

12. The method of claim 9, wherein the generative model is a generalized foundation model.

13. A method implemented by one or more processors, the method comprising:
   receiving perception data captured by one or more perception sensors of an autonomous vehicle during operation of the autonomous vehicle in an environment;
   initiating querying of a generative model using the received perception data to identify an event occurring in the environment during operation of the autonomous vehicle;
   in response to identifying the event, automatically initiating a teleassist session between the autonomous vehicle and a remote teleassist system;
   receiving a teleassist triggering event determined based on the received perception data;
   initiating a second querying of the generative model using at least a portion of the received perception data to attempt to confirm the teleassist triggering event; and
   in response to an inability to confirm the teleassist triggering event from the initiated second querying of the generative model, automatically rejecting initiation of a second teleassist session between the autonomous vehicle and the remote teleassist system.

14. A method implemented by one or more processors, the method comprising:
   receiving perception data captured by one or more perception sensors of an autonomous vehicle during operation of the autonomous vehicle in an environment;
   initiating querying of a generative model using the received perception data to identify an event occurring in the environment during operation of the autonomous vehicle;
   in response to identifying the event, automatically initiating a teleassist session between the autonomous vehicle and a remote teleassist system;
   during operation of the autonomous vehicle in the environment, accessing a location-based teleassist trigger configured to initiate a second teleassist session between the autonomous vehicle and a remote teleassist system when a location of the autonomous vehicle meets a location-based criterion;
   initiating a second querying of the generative model using at least a portion of the received perception data to attempt to confirm a condition associated with the location-based teleassist trigger; and
   in response to not confirming the condition associated with the location-based teleassist trigger from the initiated second querying of the generative model, automatically rejecting initiation of the second teleassist session between the autonomous vehicle and the remote teleassist system when the location of the autonomous vehicle meets the location-based criterion of the location-based teleassist trigger.

15. The method of claim 1, further comprising generating embeddings for the perception data in the autonomous vehicle and communicating the embeddings to a remote service, wherein initiating querying of the generative model is performed remote from the autonomous vehicle and uses the embeddings.

16. The method of claim 15, wherein generating the embeddings is performed by a first head of a multi-head perception model of a perception system of the autonomous vehicle.

17. The method of claim 1, further comprising sequentially initiating a plurality of queries of the generative model using the perception data, the plurality of queries having increasing specificity.

18. The method of claim 1, wherein initiating querying of the generative model using the received perception data includes:
   initiating querying of a first generative model resident in the autonomous vehicle to generate response data indicating an anomalous event; and
   initiating querying of a second generative model remote from the autonomous vehicle and using the response data to attempt to identify the anomalous event.

19. A method implemented by one or more processors, the method comprising:
   receiving perception data captured by one or more perception sensors of an autonomous vehicle during operation of the autonomous vehicle in an environment;
   initiating querying of a generative model using the received perception data to identify an event occurring in the environment during operation of the autonomous vehicle; and
   in response to identifying the event, automatically initiating a teleassist session between the autonomous vehicle and a remote teleassist system;
   wherein initiating querying of the generative model using the received perception data includes:
      initiating querying a first generalized foundation model to generate embeddings associated with one or more rare events in the environment; and
      initiating querying of a second model using the generated embeddings, wherein the second model is trained using embeddings identifying a plurality of rare events in the environment and generated by the first generalized foundation model.

20. An autonomous vehicle control system resident in an autonomous vehicle, the autonomous vehicle control system comprising:
   at least one processor; and
   memory storing instructions that, when executed, cause the at least one processor to be operable to perform a method comprising:
      receiving perception data captured by one or more perception sensors of the autonomous vehicle during operation of the autonomous vehicle in an environment;
      initiating querying of a generative model using the received perception data to identify an event occurring in the environment during operation of the autonomous vehicle;
      in response to identifying the event, automatically initiating a teleassist session between the autonomous vehicle and a remote teleassist system;
      periodically communicating perception data from the autonomous vehicle to a remote service to cause the remote service to initiate the querying of the generative model using the communicated perception data; and
      dynamically adjusting a rate of the periodic communications based on an operational state of the autonomous vehicle;
      wherein dynamically adjusting the rate of periodic communications of perception data includes increasing the rate of periodic communications while the autonomous vehicle is queued for the teleassist session.

21. A system comprising:
   at least one processor; and
   memory storing instructions that, when executed, cause the at least one processor to be operable to perform a method comprising:
      receiving perception data captured by one or more perception sensors of an autonomous vehicle during operation of the autonomous vehicle in an environment;
      initiating querying of a generative model using the received perception data to identify an event occurring in the environment during operation of the autonomous vehicle, wherein initiating querying of the generative model using the received perception data includes:
         initiating querying of a first generative model resident in the autonomous vehicle to generate response data indicating an anomalous event; and
         initiating querying of a second generative model remote from the autonomous vehicle and using the response data to attempt to identify the anomalous event; and
      in response to identifying the event, automatically initiating a teleassist session between the autonomous vehicle and a remote teleassist system.

22. A method implemented by one or more processors, the method comprising:
   receiving perception data captured by one or more perception sensors of an autonomous vehicle during operation of the autonomous vehicle in an environment;
   initiating querying of a generative model using the received perception data to identify an event occurring in the environment during operation of the autonomous vehicle, wherein initiating querying of the generative model using the received perception data to identify the event includes sequentially initiating a plurality of queries of the generative model using the perception data, the plurality of queries having increasing specificity; and
   in response to identifying the event, automatically initiating a teleassist session between the autonomous vehicle and a remote teleassist system.

* * * * *